US009489191B2

(12) United States Patent
Ukai et al.

(10) Patent No.: US 9,489,191 B2
(45) Date of Patent: Nov. 8, 2016

(54) APPLICATION PROGRAM UPDATE SYSTEM, COMMUNICATION DEVICE FOR THE SAME, PORTABLE COMMUNICATION TERMINAL FOR THE SAME, AND COMPUTER READABLE MEDIUM FOR THE SAME

(71) Applicant: DENSO CORPORATION, Kariya, Aichi-pref. (JP)

(72) Inventors: Hiroki Ukai, Nagoya (JP); Takashi Uefuji, Chiryu (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 60 days.

(21) Appl. No.: 14/402,291

(22) PCT Filed: Apr. 17, 2013

(86) PCT No.: PCT/JP2013/002602
§ 371 (c)(1),
(2) Date: Nov. 19, 2014

(87) PCT Pub. No.: WO2013/175704
PCT Pub. Date: Nov. 28, 2013

(65) Prior Publication Data
US 2015/0154015 A1    Jun. 4, 2015

(30) Foreign Application Priority Data

May 23, 2012  (JP) ................................. 2012-117502
Jan. 29, 2013  (JP) ................................. 2013-014376

(51) Int. Cl.
*G06F 9/44*   (2006.01)
*G06F 9/445*  (2006.01)
(Continued)

(52) U.S. Cl.
CPC ............. *G06F 8/66* (2013.01); *G01C 21/3697* (2013.01); *H04M 1/72525* (2013.01)

(58) Field of Classification Search
CPC .................................... G06F 8/65; G06F 8/60
USPC ................................................. 717/170–174
See application file for complete search history.

(56) References Cited

U.S. PATENT DOCUMENTS

2006/0212177 A1      9/2006  Furuta
2009/0328026 A1 *   12/2009  Yamashita ............... G06F 8/65
                                                             717/170
(Continued)

FOREIGN PATENT DOCUMENTS

| JP | 2000003271 A | 1/2000 |
| JP | 2002007134 A | 1/2002 |
| JP | 2005228152 A | 8/2005 |
| JP | 2006043346 A | 2/2006 |

(Continued)

OTHER PUBLICATIONS

International Search Report and Written Opinion (in Japanese with English Translation) for PCT/JP2013/002602, mailed Jul. 2, 2013; ISA/JP.

(Continued)

*Primary Examiner* — Duy Khuong Nguyen
(74) *Attorney, Agent, or Firm* — Harness, Dickey & Pierce, P.L.C.

(57) ABSTRACT

An application program update system includes: a communication device having a cooperative application program for executing a content in cooperation with a portable communication terminal; a communication device update program storage device that stores a communication device update program for updating the cooperative application program; and a communication device update program acquisition device that inputs the communication device update program to the communication device when a version of the cooperative application program installed on the communication device does not match a version of the communication device update program.

12 Claims, 16 Drawing Sheets

(51) Int. Cl.
  *H04M 1/725* (2006.01)
  *G01C 21/36* (2006.01)

(56) References Cited

U.S. PATENT DOCUMENTS

| | | | |
|---|---|---|---|
| 2012/0032945 A1* | 2/2012 | Dare | G06F 3/0481 |
| | | | 345/418 |
| 2012/0046808 A1 | 2/2012 | Furuta | |
| 2013/0005258 A1* | 1/2013 | Uefuji | H04M 1/72527 |
| | | | 455/41.2 |
| 2014/0214965 A1* | 7/2014 | Ohashi | G06F 17/30876 |
| | | | 709/205 |

FOREIGN PATENT DOCUMENTS

| | | |
|---|---|---|
| JP | 2006154969 A | 6/2006 |
| JP | 2008185520 A | 8/2008 |
| JP | 2009265743 A | 11/2009 |
| JP | 2010218070 A | 9/2010 |
| JP | 2011134263 A | 7/2011 |

OTHER PUBLICATIONS

Denso Technical Review, Dec. 2010 vol. 15, p. 14, Published Dec. 10, 2010.

* cited by examiner

FIG. 7

| | | UPDATE VERSION | | | | |
|---|---|---|---|---|---|---|
| | | 2.0 | 2.1 | 3.0 | 4.0 | |
| CURRENT VERSION | 1.0 | file1 | file2 | file3 | file4 | |
| | 2.0 | | file2 | file3 | file4 | |
| | 2.1 | | | file3 | file4 | |
| | 3.0 | | | | file4 | |
| | 4.0 | | | | | |
| | | | | | | |

APPLICATION PROGRAM UPDATE SYSTEM, COMMUNICATION DEVICE FOR THE SAME, PORTABLE COMMUNICATION TERMINAL FOR THE SAME, AND COMPUTER READABLE MEDIUM FOR THE SAME

CROSS REFERENCE TO RELATED APPLICATIONS

This application is a U.S. National Phase Application under 35 U.S.C. 371 of International Application No. PCT/JP2013/002602 filed on Apr. 17, 2013 and published in Japanese as WO 2013/175704 A1 on Nov. 28, 2013. This application is based on and claims the benefit of priority from Japanese Patent Applications No. 2012-117502 filed on May 23, 2012, and No. 2013-014376 filed on Jan. 29, 2013. The entire disclosures of all of the above applications are incorporated herein by reference.

TECHNICAL FIELD

The present disclosure relates to an application program update system that updates an application program on the basis of an update program, a communication device and a portable communication terminal which configure the application program update system, and a computer readable medium for updating the application program on the basis of the update program.

BACKGROUND ART

Up to now, as disclosed in, for example, patent literature No. 1, a technique has been known which reads version information on an application program installed on a terminal, and upgrades (updates) the application program on the basis of the version information.

Incidentally, in recent years, a cooperative application program is being considered which connects a communication device installed on, for example, a vehicle to a portable communication terminal carried by a user to enable a communication with each other, and allows the communication device and the portable communication terminal to execute a content in conjunction with each other. It is general that the cooperative application programs installed on the communication devices and the portable communication terminals are upgraded in the respective devices or the respective terminals, separately. In this case, since the portable communication terminals are carried by the users in use, the cooperative application program installed on each portable communication terminal can be frequently upgraded. However, because the communication device installed in the vehicle is not carried by the user in use, it is difficult to frequently upgrade the cooperative application program installed on the communication device. If a version of the cooperative application program installed on the communication device is not consistent with a version of the cooperative application program installed on the portable communication terminal (for example, a case in which the version of the cooperative application program of the communication device does not match with the version of the cooperative application program of the portable communication terminal, a case in which the cooperative application program of the communication device is not upgraded to a version corresponding to the cooperative application program of the portable communication terminal, etc.), there is the potential that the communication device and the portable communication terminal could not execute the content in cooperation with each other.

PRIOR ART LITERATURES

Patent Literature

Patent Literature 1: JP-A-2005-228152

SUMMARY OF INVENTION

It is an object of the present disclosure to provide an application program update system that enables a communication device and a portable communication terminal to execute a content in cooperation with each other even if a cooperative application program installed on the communication device and a cooperative application program installed on the portable communication terminal are updated, separately, the communication device and the portable communication terminal which configure the application program update system, and a computer readable medium for updating the application program on the basis of an update program, which operates in the communication device or the portable communication terminal.

According to a first aspect of the present disclosure, an application program update system includes: a communication device having a cooperative application program for executing a content in cooperation with a portable communication terminal; a communication device update program storage device that stores an update program of the cooperative application program installed on the communication device as a communication device update program; and a communication device update program acquisition device that inputs the communication device update program to the communication device when a version of the cooperative application program installed on the communication device does not match a version of the communication device update program stored in the communication device update program storage device.

In the above system, the communication device update program of an appropriate version is stored in the communication device update program storage device in advance, as a result of which even in the communication device having the cooperative application difficult to frequently upgrade, the cooperative application installed on the communication device can be updated to an appropriate version. With this configuration, even if the cooperative application installed on the communication device, and the cooperative application installed on the portable communication terminal are updated, separately, the communication device and the portable communication terminal can execute the content in cooperation with each other.

According to a second aspect of the present disclosure, a communication device that has a cooperative application program for executing a content in cooperation with a portable communication terminal, and acquires a communication device update program which is an update program of the cooperative application program from an external communication device update program storage device, the communication device includes: a communication device update program acquisition device that acquires the communication device update program when a version of an installed cooperative application program does not match a version of the communication device update program stored in the communication device update program storage device.

In the above communication device, the communication device update program of an appropriate version is stored in the communication device update program storage device in advance, as a result of which even in the communication device having the cooperative application difficult to frequently upgrade, the cooperative application installed on the communication device can be updated to an appropriate version. With this configuration, even if the cooperative application installed on the communication device, and the cooperative application installed on the portable communication terminal are updated, separately, the communication device and the portable communication terminal can execute the content in cooperation with each other.

According to a third aspect of the present disclosure, a portable communication terminal that has a cooperative application program for executing a content in cooperation with a communication device, and acquires a portable communication terminal update program which is an update program of the cooperative application program from an external portable communication terminal update program storage device, the portable communication terminal includes: a portable communication terminal update program acquisition device that acquires the portable communication terminal update program when a version of an installed cooperative application program does not match a version of the portable communication terminal update program stored in the portable communication terminal update program storage device.

In the above portable communication terminal, the portable communication terminal update program of an appropriate version is stored in the portable communication terminal update program acquisition device in advance, as a result of which even in the portable communication terminal having the cooperative application difficult to frequently upgrade, the cooperative application installed on the portable communication terminal can be updated to an appropriate version. With this configuration, even if the cooperative application installed on the portable communication terminal, and the cooperative application installed on the communication device are updated, separately, the portable communication terminal and the communication device can execute the content in cooperation with each other.

According to a fourth aspect of the present disclosure, a tangible non-transitory computer readable medium stores computer executable instructions, and the instructions comprises a computer executable method for updating an application program based on an update program. The tangible non-transitory computer readable medium has a cooperative application program for executing a content in cooperation with a portable communication terminal, and is installed on a communication device for acquiring a communication device update program, which is an update program of the cooperative application program, from an external communication device update program storage device. The instructions includes: comparing a version of the cooperative application program installed on the communication device with a version of the communication device update program stored in the communication device update program storage device; and inputting the communication device update program to the communication device when the version of the cooperative application program installed on the communication device does not match the version of the communication device update program stored in the communication device update program storage device.

In the above computer readable medium, the communication device update program of an appropriate version is stored in the communication device update program storage device in advance, as a result of which even in the communication device having the cooperative application difficult to frequently upgrade, the cooperative application installed on the communication device can be updated to an appropriate version. With this configuration, even if the cooperative application installed on the communication device, and the cooperative application installed on the portable communication terminal are updated, separately, the communication device and the portable communication terminal can execute the content in cooperation with each other.

According to a fifth aspect of the present disclosure, a tangible non-transitory computer readable medium stores computer executable instructions, and the instructions comprises a computer executable method for updating an application program based on an update program. The tangible non-transitory computer readable medium has a cooperative application program for executing a content in cooperation with a communication device, and is installed on a portable communication terminal for acquiring a portable communication terminal update program, which is an update program of the cooperative application program, from an external portable communication terminal update program storage device. The instructions includes: comparing a version of the cooperative application program installed on the portable communication terminal with a version of the portable communication terminal update program stored in the portable communication terminal update program storage device; and inputting the portable communication terminal update program to the portable communication terminal when the version of the cooperative application program installed on the portable communication terminal does not match the version of the portable communication terminal update program stored in the portable communication terminal update program storage device.

In the above computer readable medium, the portable communication terminal update program of an appropriate version is stored in the portable communication terminal update program acquisition device in advance, as a result of which even in the portable communication terminal having the cooperative application difficult to frequently upgrade, the cooperative application installed on the portable communication terminal can be updated to an appropriate version. With this configuration, even if the cooperative application installed on the portable communication terminal, and the cooperative application installed on the communication device are updated, separately, the portable communication terminal and the communication device can execute the content in cooperation with each other.

BRIEF DESCRIPTION OF DRAWINGS

The above and other objects, features and advantages of the present disclosure will become more apparent from the following detailed description made with reference to the accompanying drawings. In the drawings:

FIG. 7 is a diagram illustrating the details of update difference information.

EMBODIMENTS FOR CARRYING OUT INVENTION

First Embodiment

Figure 1:
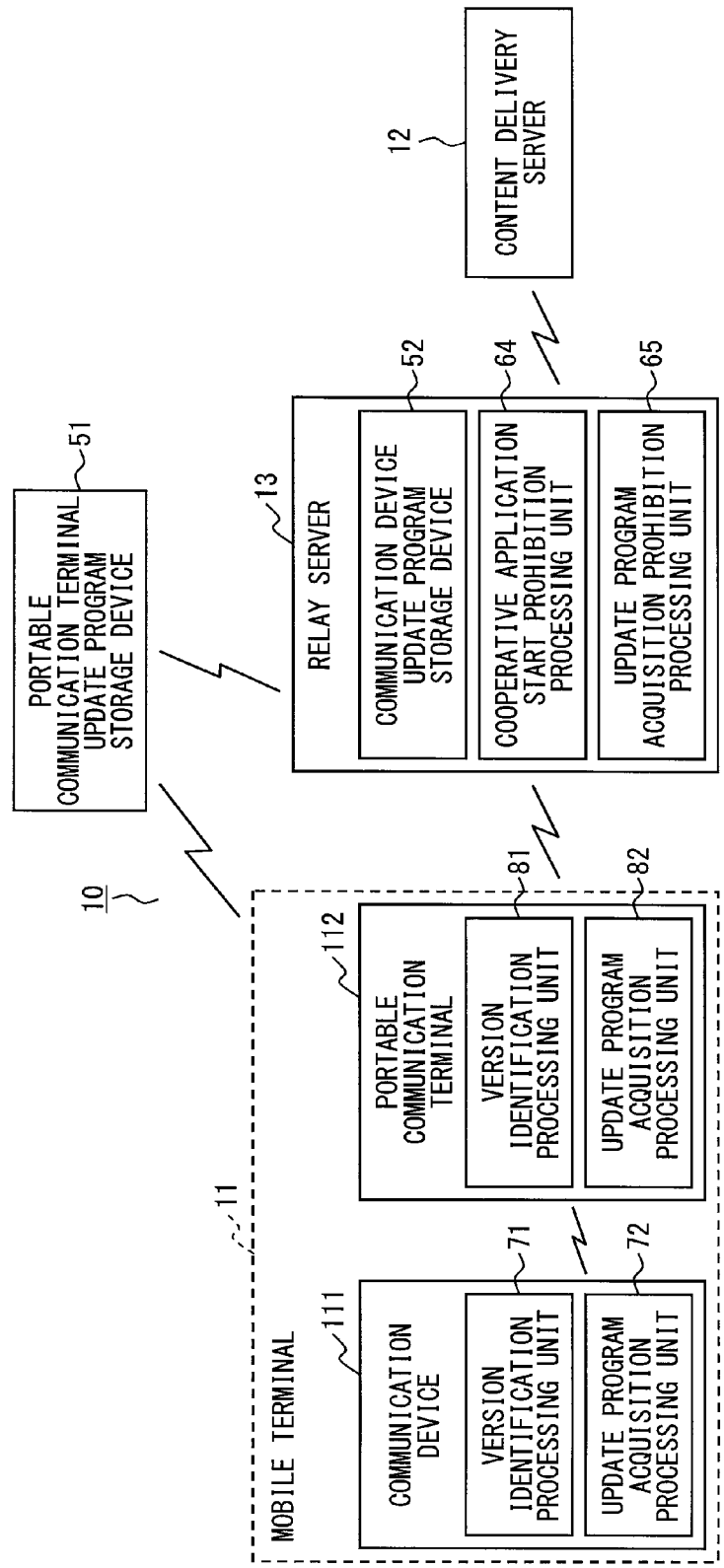
FIG. 1 is a diagram schematically illustrating an overall configuration of an application program update system according to a first embodiment.

A first embodiment of this disclosure will be described with reference to the drawings. As illustrated in FIG. 1, an application program update system 10 includes a mobile terminal 11, a content delivery server 12, and a relay server 13 that relays a data communication between the mobile terminal 11 and the content delivery server 12.

In this example, the mobile terminal 11 includes a communication device 111 mounted on a vehicle, and a portable communication terminal 112 connected to the communication device 111 to be communicatable therewith. Alternatively, the mobile terminal 11 may be configured by only the communication device 111, or may be configured by only the portable communication terminal 112. The communication device 111 is configured by, for example, a navigation device. When the portable communication terminal 112 is brought to an interior of a vehicle, the portable communication terminal 112 is connected to the communication device 111 to be communicatable therewith through a wireless communication line. As the wireless communication line, for example, a Bluetooth communication line (Bluetooth: registered trademark) is assumed. The communication device 111 and the portable communication terminal 112 will be described later.

When receiving a delivery request for the content from the mobile terminal 11, the content delivery server 12 delivers a variety of content to the mobile terminal 11 indirectly through the relay server 13, or directly not through the relay server 13. As the content delivered from the content delivery server 12, for example, music content for reproducing music, or internet radio content for realizing an internet radio is conceivable as streaming type content. Also, as a non-streaming type content, a facility search content for realizing a facility search service, a news delivery content for realizing a news delivery, or an SNS service content for realizing a social networking service is conceivable.

The relay server 13 is connected to a portable communication terminal update program storage device 51 (corresponding to a portable communication terminal update program storage device) located outside of the relay server 13 to enable a wireless communication or a wired communication therewith. The portable communication terminal update program storage device 51 is installed in a server different from the relay server 13, and an update program of a cooperative application program installed on the portable communication terminal 112 which will be described in detail later is stored as a portable communication terminal update program. In this case, the portable communication terminal update program storage device 51 always retains the portable communication terminal update program of the latest version to the portable communication terminal update program of a version (version old by several generations) before several generations. Also, the portable communication terminal update program storage device 51 is also configured to enable a communication directly with the portable communication terminal 112.

Also, the relay server 13 includes a communication device update program storage device 52 (corresponding to a communication device update program storage device) within the relay server 13. The communication device update program storage device 52 stores an update program of a cooperative application program installed on the communication device 111 which will be described in detail later as a communication device update program. In this case, the communication device update program storage device 52 always retains the communication device update program of the latest version to the communication device update program of a version (version old by several generations) before several generations.

Also, the relay server 13 retains, for example, update difference information illustrated in FIG. 7. The update difference information is information indicative of a difference file of the update program necessary to upgrade the version (current version) of the cooperative application program before update to the updated version (latest version, or a newer one of the current versions of the communication device 111 and the portable communication terminal 112) of the cooperative application program after update. In this case, difference files 1 to 4 are required to upgrade the cooperative application program, for example, from version 1.0 to version 4.0, and difference files 3 and 4 are required to upgrade the cooperative application program, for example, from version 2.1 to version 4.0.

Also, the relay server 13 allows a control device not shown for controlling the overall operation of the relay server 13 to execute a computer program, thereby virtually realizing a cooperative application program start prohibition processing unit 64 corresponding to a content execution prohibition device, and an update program acquisition prohibition processing unit 65 corresponding to a update program acquisition prohibition device by software.

If the version of the cooperative application program of the portable communication terminal 112 does not match the version of the cooperative application program of the communication device 111, the cooperative application program start prohibition processing unit 64 is so set as not to transmit a start permission signal of the cooperative application program to the portable communication terminal 112 and the communication device as long as the versions of the respective cooperative application programs provided in the portable communication terminal 112 and the communication device 111 do not match each other, by the provision (download) of the communication device update program from the communication device update program storage device 52 to the communication device 111, and/or the provision (download) of the portable communication terminal update program from the portable communication terminal update program storage device 51 to the portable communication terminal 112. With the above configuration, the cooperative application program start prohibition processing unit 64 prohibits the start of the cooperative application program in the mobile terminal 11 until the versions of the respective cooperative application programs provided in the portable communication terminal 112 and the communication device 111 match each other. With the above configuration, the cooperative application program start prohibition processing unit 64 prohibits the content from being executed by the cooperative application program in the mobile terminal 11.

Alternatively, the cooperative application program start prohibition processing unit 64 may be so set as not to transmit the start permission signal until the version of the cooperative application program installed on the portable communication terminal 112 matches the latest version of the portable communication terminal update program. With the above configuration, the cooperative application program start prohibition processing unit 64 may prohibit the start (execution of the content by the cooperative application program) of the cooperative application program in the mobile terminal 11. Also, the cooperative application program start prohibition processing unit 64 may be so set as not to transmit the start permission signal until the version of the cooperative application program installed on the communication device 111 matches the latest version of the communication device update program. With the above configuration, the cooperative application program start prohibition processing unit 64 may prohibit the start (execution of the content by the cooperative application program) of the cooperative application program in the mobile terminal 11.

As a result of providing the communication device 111 with the update program, the update program acquisition prohibition processing unit 65 verifies whether the version of the cooperative application program of the communication device 111 becomes newer than the version of the cooperative application program of the portable communication terminal 112, or not. As a result of the verification, if the update program acquisition prohibition processing unit 65 determines that the version of the cooperative application program of the communication device 111 becomes newer than the version of the cooperative application program of the portable communication terminal 112, the update program acquisition prohibition processing unit 65 prohibits the provision of the communication device update program to the communication device 111.

Figure 2:
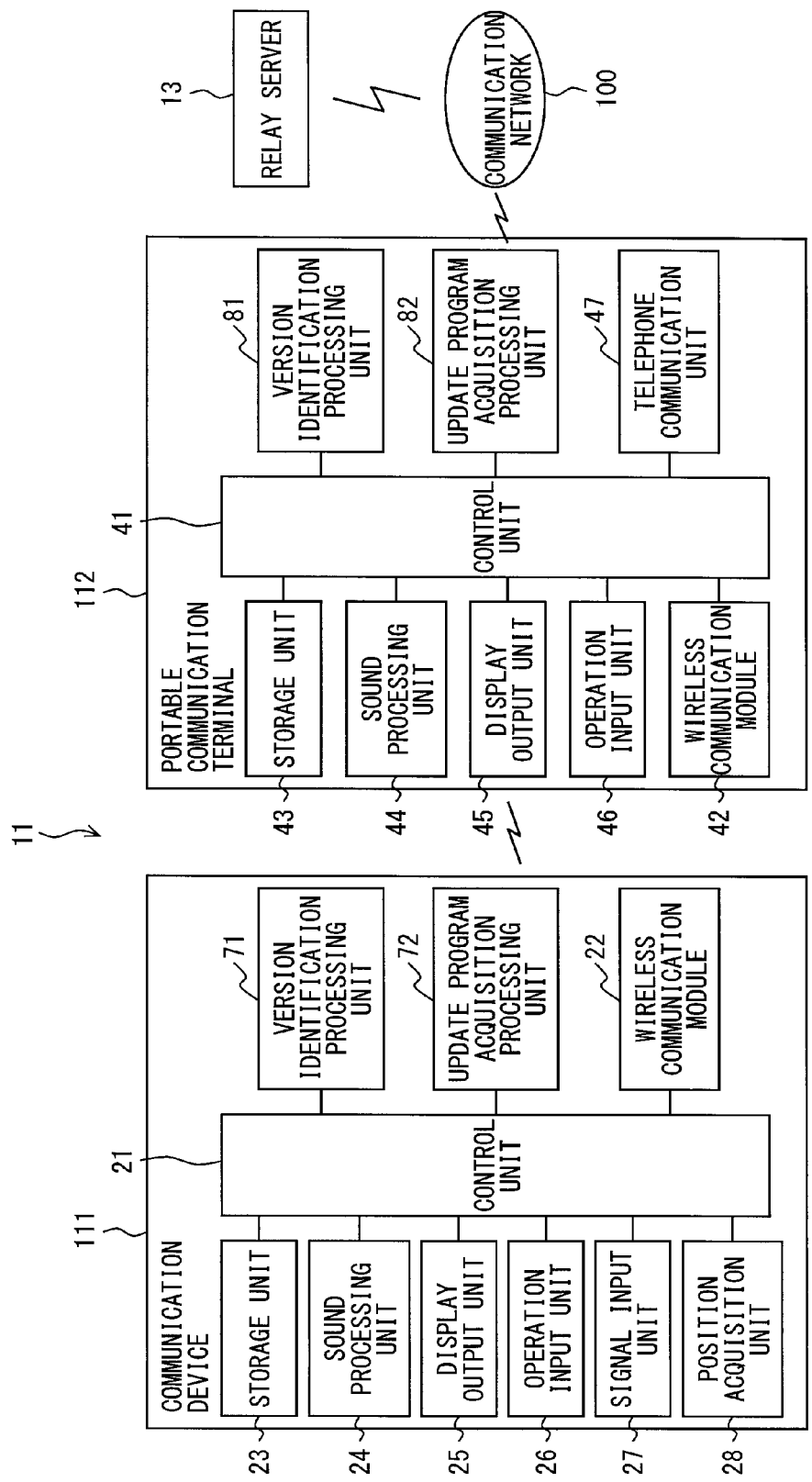
FIG. 2 is a diagram schematically illustrating a configuration of a communication device and a portable communication terminal which configure a mobile terminal.

Subsequently, the configurations of the communication device 111 and the portable communication terminal 112 will be described with reference to FIG. 2.

The communication device 111 includes a control unit 21, a wireless communication module 22, a storage unit 23, a sound processing unit 24, a display output unit 25, an operation input unit 26, a signal input unit 27, and a position acquisition unit 28. The control unit 21 includes a known microcomputer having a CPU, a RAM, a ROM, and an I/O bus not shown. The control unit 21 controls the overall operation of the communication device 111 according to a computer program stored in the ROM or the storage unit 23. Also, the communication device 111 allows the control unit 21 to execute the computer program (including an application program update program), thereby virtually realizing a communication device version identification processing unit 71 corresponding to a communication device version identification device, and a communication device update program acquisition processing unit 72 corresponding to a communication device update program acquisition device by software.

The wireless communication module 22 establishes a wireless communication line to a wireless communication module 42 provided in the portable communication terminal 112. The wireless communication module 22 conducts a variety of communications with the portable communication terminal 112 through the communication line. The storage unit 23 includes a nonvolatile storage medium such as a hard disk drive. The storage unit 23 stores a variety of programs such as a variety of computer programs and content programs, a cooperative application program for realizing a cooperative function that executes the content in cooperation with an external device or a terminal, and a dedicated player (application program) which realizes a function of an operating system for realizing the cooperative application program, and data used for the respective programs. The communication device 111 allows the cooperative application program and the dedicated player to be installed thereon, separately, thereby enabling a variety of content (including the content delivered from the relay server 13 or another content server) executable on the cooperative application program to be executed by the communication device 111, independently.

The sound processing unit 24 is connected to a microphone and a speaker not shown, and has a known sound input function and a known sound output function. Also, the sound processing unit 24 outputs an instruction of the operation of the communication device 111 to the control unit 21 on the basis of a sound input from the microphone. At the same time, the sound processing unit 24 outputs a sound from the speaker on the basis of an instruction from the control unit 21 or the wireless communication module 22, thereby being capable of realizing a so-called hands-free capability.

Figure 4:
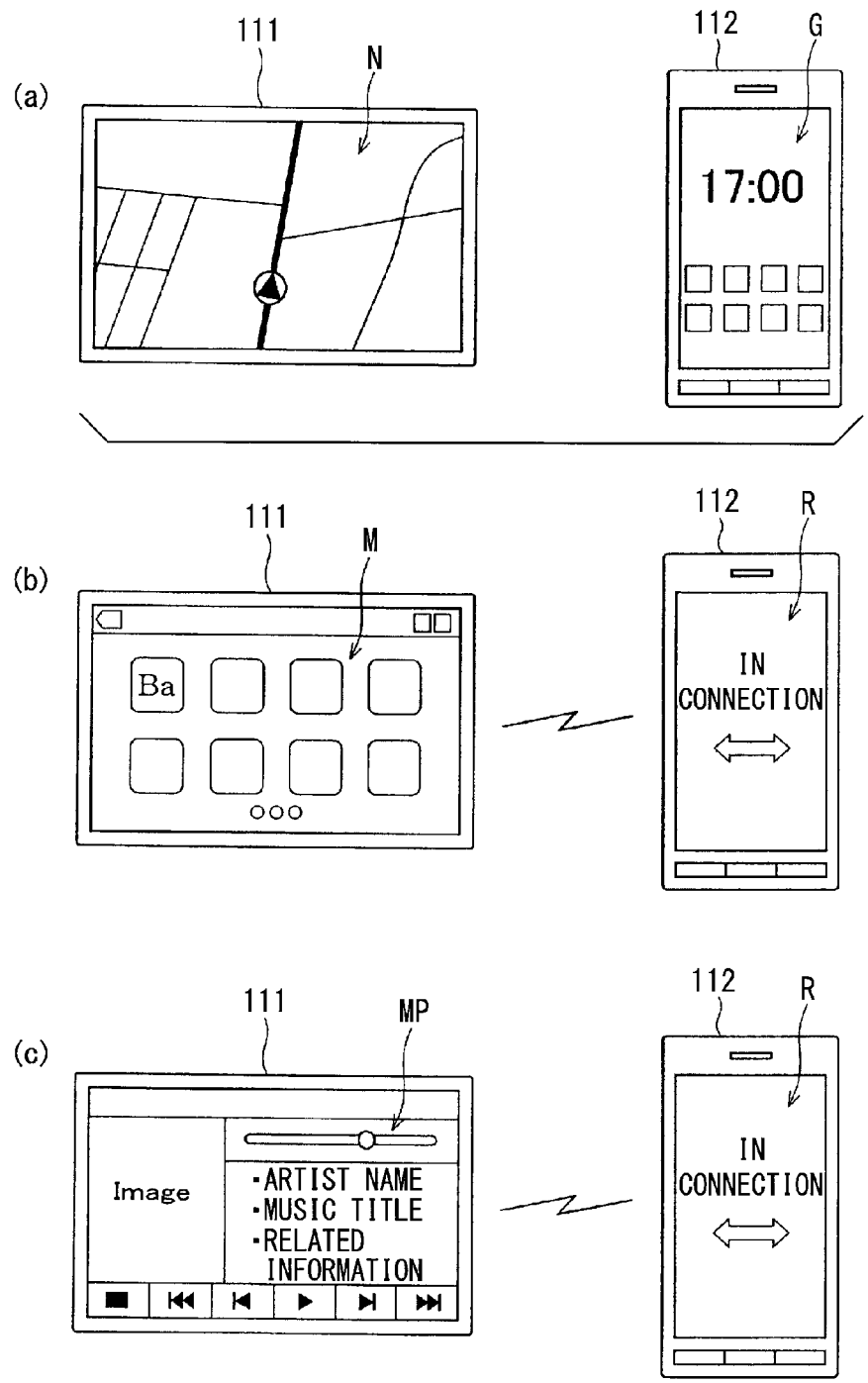
FIGS. 4(a) to 4(c) are diagrams schematically illustrating a transition state of a screen until a communication device and a portable communication terminal are connected to enable a communication with each other, and execute the content.

The display output unit 25 includes, for example, a liquid crystal display unit or an organic EL, and displays various pieces of information on the basis of a display instruction signal from the control unit 21. On a screen of the display output unit 25 is provided a touch panel switch of a known pressure-sensitive type, an electromagnetic induction type, a capacitive type, or a type combining those types together. A variety of screens such as an operation input screen (input interface) for inputting operation on the content, an output screen (output interface) for outputting the execution details of the content, and a navigation screen N for route guide illustrated in, for example, FIG. 4(a) are displayed on the display output unit 25.

The operation input unit 26 includes a variety of switches such as a touch panel switch disposed on the screen of the display output unit 25, and mechanical switches disposed around the display output unit 25. The operation input unit 26 outputs an operation detection signal to the control unit 21 according to the user's operation on the various switches. The control unit 21 analyzes the operation detection signal input from the operation input unit 26 to identify the operation details of the user, and executes a variety of processing on the basis of the identified operation details.

The signal input unit 27 is connected to an ACC switch (accessary switch) not shown which is mounted on the vehicle, and inputs an ACC signal output from the ACC switch to the control unit 21. The control unit 21 controls on/off operation of a power supply circuit not shown on the basis of on/off of the input ACC signal. That is, the control unit 21 turns on the power supply circuit at a moment when the ACC signal transitions from off to on. Also, the control unit 21 turns off the power supply circuit at a moment when the ACC signal transitions from on to off.

The position acquisition unit 28 is equipped with a variety of sensors such as well-known geomagnetic sensors, gyroscopes, vehicle velocity sensors, or GPS receivers not shown. The position acquisition unit 28 complements detection signals input from those sensors with each other to acquire position information on the vehicle. The position acquisition unit 28 outputs the acquired position information on the vehicle to the control unit 21. The control unit 21 executes so-called navigation processing on the basis of the position information on the vehicle acquired by the position acquisition unit 28, a guide route searched by a route search unit not shown.

The communication device version identification processing unit 71 identifies the current version of the cooperative application program on the basis of the version information of the cooperative application program installed on the communication device 111.

The communication device update program acquisition processing unit 72 determines whether the version of the cooperative application program matches the version of the communication device update program stored in the communication device update program storage device 52, or not, for example, when the cooperative application program installed on the communication device 111 starts. If both of those versions do not match each other, the communication device update program acquisition processing unit 72 is set to download (acquire) the communication device update program to the communication device 111 from the communication device update program storage device 52. The execution timing of the determination process of whether those versions match each other is not limited to the start time of the cooperative application program, but can be set with an appropriate change. Also, if it is determined that the version of the cooperative application program of the portable communication terminal 112 does not match the version of the cooperative application program of the communication device 111 by the relay server 13, the communication device update program acquisition processing unit 72 is set to download (acquire) the communication device update program stored in the communication device update program storage device 52 to the communication device 111.

Subsequently, the configuration of the portable communication terminal 112 will be described. The portable communication terminal 112 includes a control unit 41, the wireless communication module 42, a storage unit 43, a sound processing unit 44, a display output unit 45, an operation input unit 46, and a telephone communication unit 47. The control unit 41 includes a known microcomputer having a CPU, a RAM, a ROM, and an I/O bus not shown. The control unit 41 controls the overall operation of the portable communication terminal 112 according to a computer program stored in the ROM or the storage unit 43. Also, the portable communication terminal 112 allows the control unit 41 to execute the computer program (including an application program update program), thereby virtually realizing a portable communication terminal version identification processing unit 81 corresponding to a portable communication terminal version identification device, and a portable communication terminal update program acquisition processing unit 82 corresponding to a portable communication terminal update program acquisition device by software.

The wireless communication module 42 establishes a wireless communication line to the wireless communication module 22 provided in the communication device 111. The wireless communication module 42 conducts a variety of communications with the communication device 111 through the communication line. The storage unit 43 includes a nonvolatile storage medium such as a memory card. The storage unit 43 stores a variety of programs such as a variety of computer programs and content programs, a cooperative application program for realizing a cooperative function that executes the content in cooperation with an external device or a terminal, and a dedicated player (application program) which realizes a function of an operating system for realizing the cooperative application program, and data used for the respective programs. The portable communication terminal 112 allows the cooperative application program and the dedicated player to be installed thereon, separately, thereby enabling a variety of content (including the content delivered from the relay server 13 or another content server) executable on the cooperative application program to be executed by the portable communication terminal 112, independently.

The cooperative application program installed on the communication device 111 and the cooperative application program installed on the portable communication terminal 112 as described above can realize the cooperative function for allowing the communication device 111 and the portable communication terminal 112 to execute the content in cooperation with each other. However, because the respective cooperative application programs are created for the communication device 111 and the portable communication terminal 112, those cooperative application programs are different in data structure and data size from each other. For that reason, the update program (communication device update program) of the cooperative application program installed on the communication device 111, and the update program (portable communication terminal update program) of the cooperative application program installed on the portable communication terminal 112 are stored in the respective different storage units, and managed as described above. Alternatively, both of those update programs may be stored in a common storage unit.

The sound processing unit 44 is connected to a microphone and a speaker not shown, and includes a known sound input function and a known sound output function. Also, the sound processing unit 44 outputs a speech sound input from the microphone to the control unit 41. At the same time, the sound processing unit 44 outputs a received sound input from the control unit 41, thereby being capable of realizing a so-called call function. Also, the sound processing unit 44 outputs an instruction of the operation of the portable communication terminal 112 to the control unit 41 on the basis of the sound input from the microphone. At the same time, the sound processing unit 44 outputs the sound from the speaker on the basis of an instruction from the control unit 41 or the wireless communication module 42, thereby being capable of realizing a so-called hands-free capability.

The display output unit 45 includes, for example, a liquid crystal display unit or an organic EL display unit, and displays various pieces of information on the basis of a display instruction signal from the control unit 41. On a screen of the display output unit 45 is provided a touch panel switch of a known pressure-sensitive type, an electromagnetic induction type, a capacitive type, or a type combining those types together. A variety of screens such as a normal menu screen G illustrated in, for example, FIG. 4(a) is displayed on the display output unit 45.

The operation input unit 46 includes a variety of switches such as a touch panel switch disposed on the screen of the display output unit 45, and mechanical switches disposed around the display output unit 45. The operation input unit 46 outputs an operation detection signal to the control unit 41 according to the user's operation on the various switches. The control unit 41 analyzes the operation detection signal input from the operation input unit 46 to identify the operation details of the user, and executes a variety of processing on the basis of the identified operation details.

The telephone communication unit 47 establishes a wireless communication line to a communication network 100, and executes a telephone communication through the communication line. In this case, the communication network 100 includes facilities such as cellular phone base stations or base station control devices not shown, which provide a cellular phone communication service using a known public line network. Also, the control unit 41 is connected to the communication network 100 through the telephone communication unit 47, and can execute a variety of data communications with the content delivery server 12 indirectly through the relay server 13, or directly not through the relay server 13.

The portable communication terminal version identification processing unit 81 identifies the current version of the cooperative application program on the basis of the version information on the cooperative application program installed on the portable communication terminal 112.

The portable communication terminal update program acquisition processing unit 82 determines whether the version of the cooperative application program matches the version of the portable communication terminal update program stored in the portable communication terminal update program storage device 51, or not, for example, when the cooperative application program installed on the portable communication terminal 112 starts. If both of those versions do not match each other, the portable communication terminal update program acquisition processing unit 82 is set to download (acquire) the portable communication terminal update program to the portable communication terminal 112 from the portable communication terminal update program storage device 51. The execution timing of the determination process of whether those versions match each other is not limited to the start time of the cooperative application program, but can be set with an appropriate change. Also, if it is determined that the version of the cooperative application program of the portable communication terminal 112 does not match the version of the cooperative application program of the communication device 111 by the relay server 13, the portable communication terminal update program acquisition processing unit 82 is set to download (acquire) the portable communication terminal update program stored in the portable communication terminal update program storage device 51 to the portable communication terminal 112.

When the communication device 111 and the portable communication terminal 112 described above are connected to each other so as to be communicatable with each other, the communication device 111 and the portable communication terminal 112 start the respective cooperative application programs provided therein, as a result of which the portable communication terminal 112 can execute the various content acquired from the content delivery server 12 in cooperation with each other. Subsequently, the operation of a case where the communication device 111 and the portable communication terminal 112 execute the content in cooperation with each other will be described.

Figure 3:
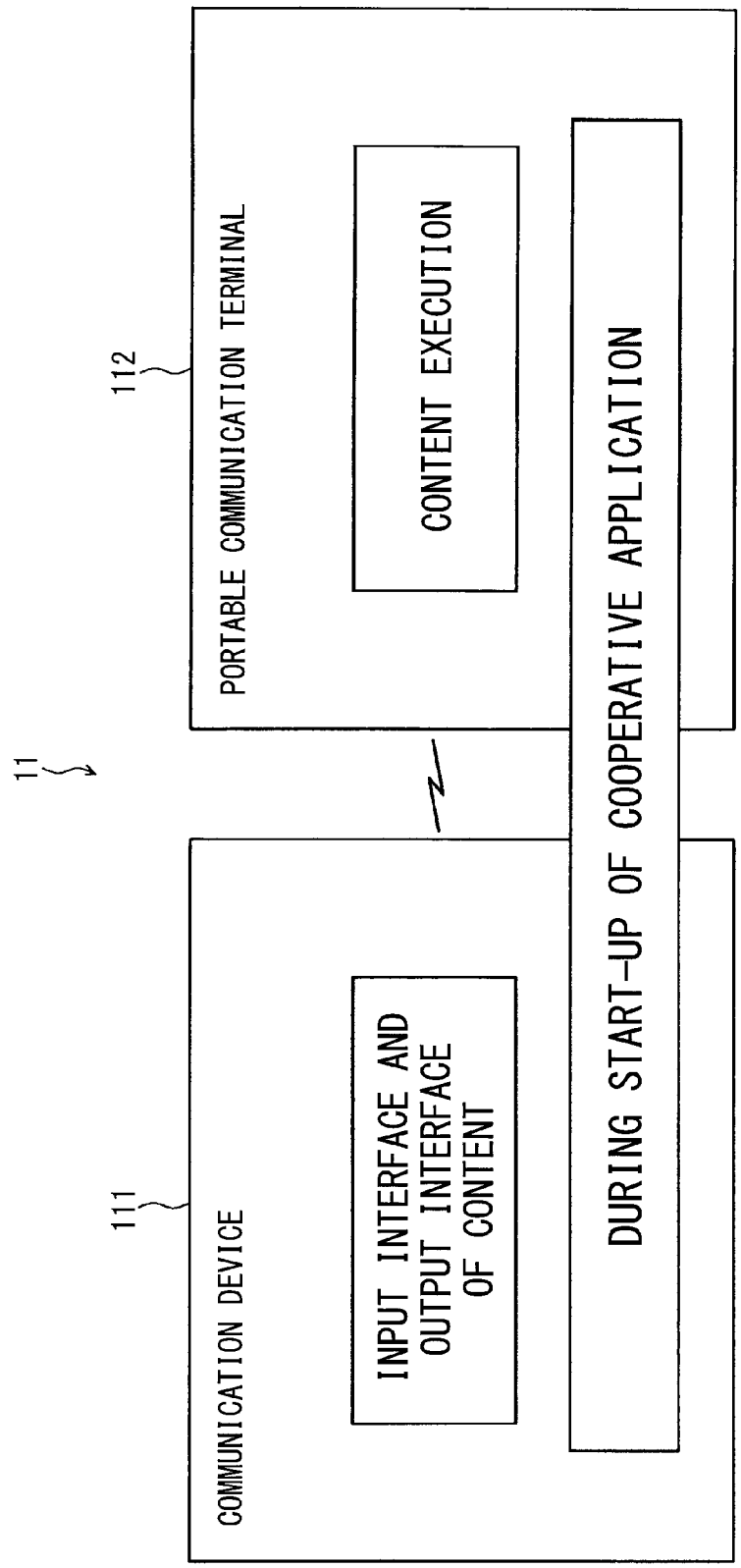
FIG. 3 is a diagram schematically illustrating a state in which the communication device and the portable communication terminal execute content in cooperation with each other.

That is, as illustrated in FIG. 3, the portable communication terminal 112 is connected to the communication device 111 so as to be communicatable with each other, and the communication device 111 and the portable communication terminal 112 start the respective cooperative application programs. Then, the execution process of the content program provided in the portable communication terminal 112 is executed by the portable communication terminal 112, and an input interface (input screen) and an output interface (output screen) of the content is provided by the communication device 111.

Also, in a state where the respective cooperative application programs start by the communication device 111 and the portable communication terminal 112, the portable communication terminal 112 functions as an execution subject of the content program, and also functions as a communication medium between the communication device 111 and the relay server 13. Hence, when the content is executed in a state where the cooperative application programs start, the portable communication terminal 112 also has a function of transmitting various pieces of data related to the content between the communication device 111 and the relay server 13.

Subsequently, a description will be given of a transition state of the screen until the communication device 111 and the portable communication terminal 112 are connected to each other to be communicatable with each other, and the content, in this case, the music content is executed on the cooperative application program.

That is, when the cooperative application program provided in the communication device 111 starts in response to the user's operation, the communication device 111 connected to the portable communication terminal 112 in a communicatable manner allows the screen of the communication device 111 to transition to a menu screen M of the cooperative application program illustrated in FIG. 4(b). The menu screen M is provided with start buttons for starting the various contents, such as a start button Ba for starting the music content. On the other hand, when the cooperative application program provided in the portable communication terminal 112 starts in response to the user's operation, the portable communication terminal 112 connected to the communication device 111 in the communicatable manner displays a menu screen of the cooperative application program not shown. In this case, in a state where the menus screens of the respective cooperative application programs are displayed in both of the communication device 111 and the portable communication terminal 112, the user can start the various content by operating the start button on any menu screen. When the content starts from any one of the communication device 111 and the portable communication terminal 112, the portable communication terminal 112 displays a lock screen R illustrated in FIG. 4(b). When the lock screen R is displayed, the use (operation) of all the content from the portable communication terminal 112 is prohibited. In this situation, in the portable communication terminal 112, the cooperative application program is kept in a start-up state, and the content is executed on the basis of a content execution instruction signal input from the external device or the terminal.

When the communication device 111 starts the music content in response to the user's operation of a start button Ba, the communication device 111 transmits an execution instruction signal of the music content to the portable communication terminal 112. With the above operation, the music content is executed by the portable communication terminal 112, and the communication device 111 reproduces music while displaying an execution screen MP of the music content illustrated in FIG. 4(c), on the basis of output data of the music content received from the portable communication terminal 112.

Subsequently, the operation of the application program update system 10 according to this embodiment will be described with reference to a flowchart. In the following description, processing to be executed by the communication device 111 is really executed by the control unit 21 of the communication device 111. Processing to be executed by the portable communication terminal 112 is really executed by the control unit 41 of the portable communication terminal 112. Processing to be executed by the relay server 13 is really executed by a control device not shown which controls the overall operation of the relay server 13.

(Upgrade Process of Cooperative Application Program Provided in Communication Device)

Figure 5:
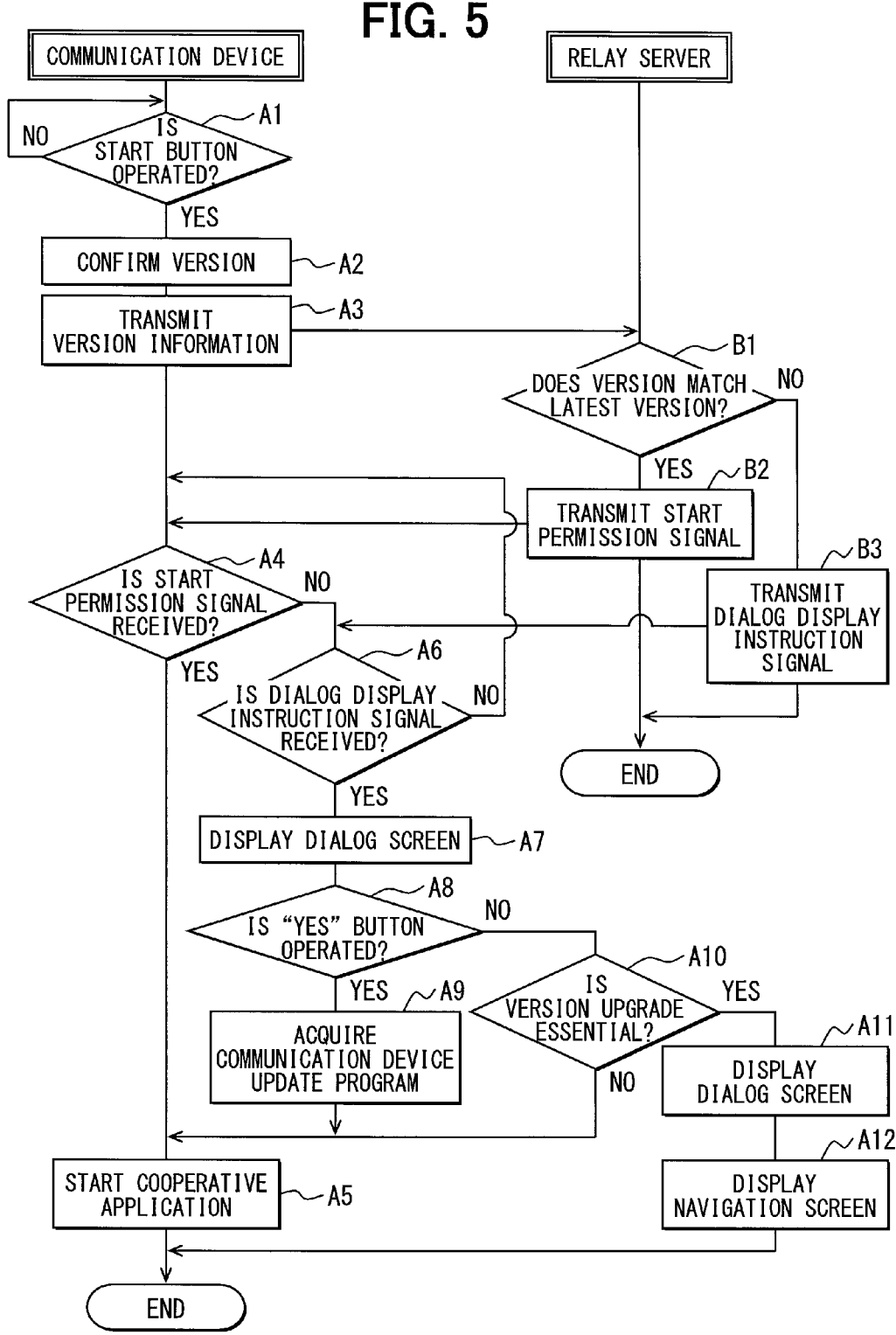
FIG. 5 is a flowchart illustrating the details of an upgrade process of a cooperative application program provided in the communication device.

As illustrated in FIG. 5, the communication device 111 connected to the portable communication terminal 112 in the communicatable manner monitors whether the start button of the cooperative application program provided in the communication device 111 operates according to the user's operation, or not (Step A1). If the start button of the cooperative application program operates in the communication device 111 (yes in Step A1), the communication device 111 confirms the version of the cooperative application program (Step A2). In addition, the communication device 111 transmits version information indicative of the version of the cooperative application program to the relay server 13 through the portable communication terminal 112 (Step A3). In this case, the portable communication terminal 112 functions as a communication medium of a data communication between the communication device 111 and the relay server 13.

Upon receiving the version information from the communication device 111, the relay server 13 determines whether the version indicated by the version information, that is, the version of the cooperative application program currently installed on the communication device 111 represents a given version (in this case, the latest version), or not (Step B1). In addition, if the version of the cooperative application program currently installed on the communication device 111 represents the latest version (yes in Step B1), the relay server 13 transmits a start permission signal of the cooperative application program to the communication device 111 (Step B2). On the other hand, if the version of the cooperative application program currently installed on the communication device 111 does not represent the latest version (no in Step B1), the relay server 13 transmits a dialog display instruction signal to the communication device 111 (Step B3). In this situation, the relay server 13 attaches version upgrade necessity designation information indicative of whether the version upgrade of the cooperative application program is essential or arbitrary to the dialog display instruction signal.

When receiving the start permission signal of the cooperative application program from the relay server 13 (yes in Step A4), the communication device 111 starts the cooperative application program in the communication device 111 (Step A5). With the above operation, the menu screen M of the cooperative application program is displayed on the communication device 111. On the other hand, when receiving the dialog display instruction signal from the relay server 13 (yes in Step A6), the communication device 111 displays a required type dialog screen G1 illustrated in FIG. 6(a) or an arbitrary type dialog screen G2 illustrated in FIG. 6(b) according to the version upgrade necessity designation information attached to the dialog display instruction signal (Step A7). A description that the version upgrade (update) of the cooperative application program of the communication device 111 is essential (refer to symbol a), and a description that the version upgrade of the cooperative application program is facilitated (refer to symbol b) are displayed on the required type dialog screen G1. On the other hand, a description that the version upgrade (update) of the cooperative application program of the communication device 111 is arbitrary (refer to symbol c), and a description that the version upgrade of the cooperative application program is facilitated (refer to symbol d) are displayed on the arbitrary type dialog screen G2. Also, those dialog screens G1 and G2 are provided with a "yes" button indicating the execution of the version upgrade, and a "no" button indicating non-execution of the version upgrade, respectively.

If the "yes" button operates on the required type dialog screen G1 or the arbitrary type dialog screen G2 (yes in Step A8), the communication device 111 downloads (acquires) the latest communication device update program from the communication device update program storage device 52 of the relay server 13, and installs the downloaded program on the communication device 111 (Step A9). In this situation, the relay server 13 provides a difference file of the update program necessary for the communication device 111 on the basis of update difference information illustrated in FIG. 7. Then, upon completion of installing the communication device update program, the communication device 111 proceeds to the above Step A5, and starts the cooperative application program.

On the other hand, if the "no" button operates on the required type dialog screen G1 or the arbitrary type dialog screen G2 (no in Step A8), the communication device 111 confirms whether the version upgrade of the cooperative application program is essential, or not, on the basis of the version upgrade necessity designation information attached to the dialog display instruction signal received from the relay server 13 (Step A10). In addition, if the version upgrade of the cooperative application program is not essential, that is, arbitrary (no in Step A10), the communication device 111 proceeds to the above Step A5, and starts the cooperative application program. On the other hand, if the version upgrade of the cooperative application program is essential (yes in Step A10), the communication device 111 displays an announcement type dialog screen G1a illustrated in FIG. 6(c) (Step A11). On the announcement type dialog screen G1a is displayed a description that the version upgrade (update) of the cooperative application program of the communication device 111 is essential (refer to symbol e). Also, the announcement type dialog screen G1a is provided with an "ok" button. If the "ok" button operates on the announcement type dialog screen G1a, the communication device 111 cancels the display of the announcement type dialog screen G1a, and displays a navigation screen N for route guide (Step A12). In this situation, the cooperative application program does not start in the communication device 111.

(Version Upgrade Process of Cooperative Application Program Provided in Portable Communication Terminal)

Figure 8:
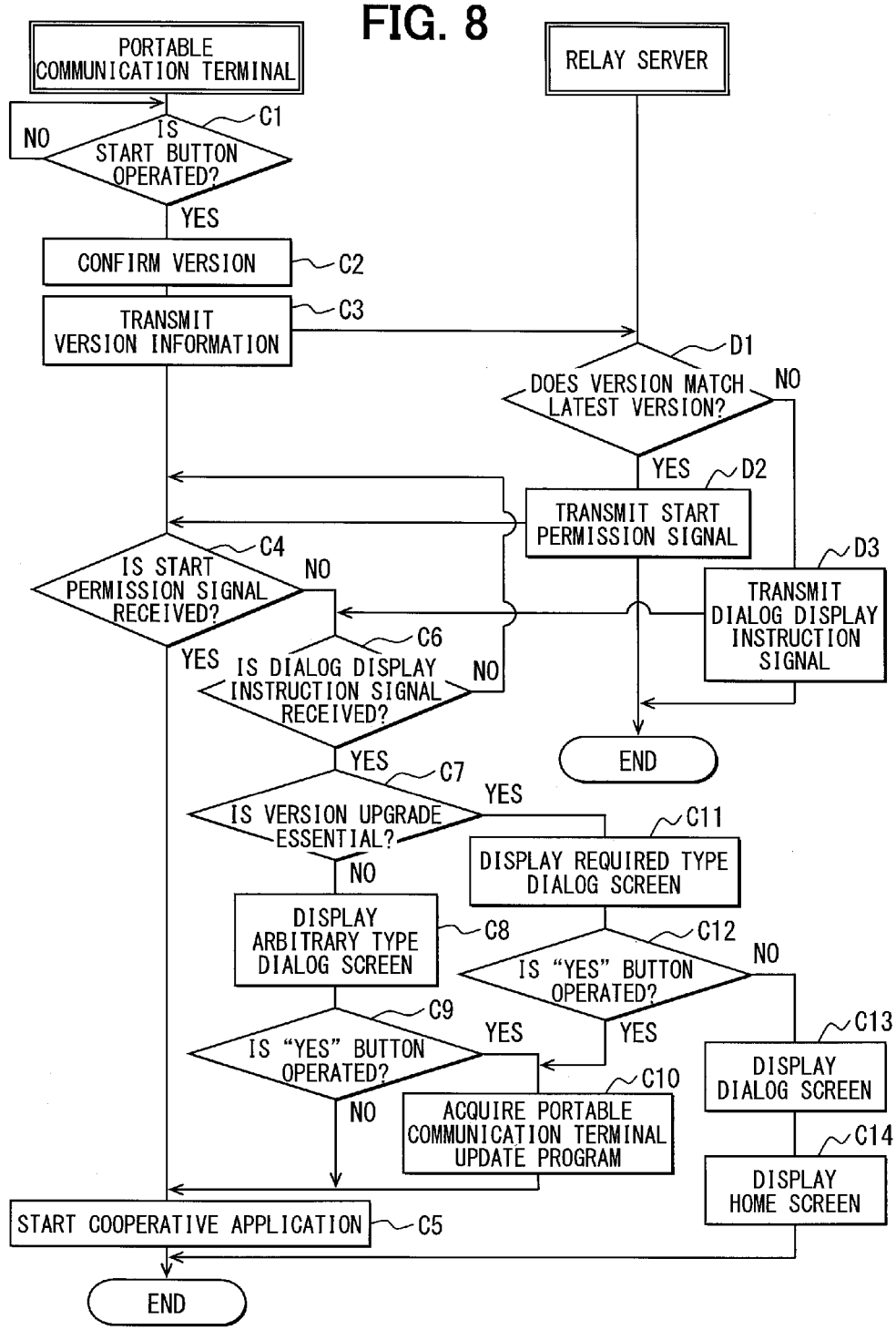
FIG. 8 is a flowchart illustrating the details of an upgrade process of a cooperative application program provided in the portable communication terminal.

As illustrated in FIG. 8, the portable communication terminal 112 connected to the communication device 111 in the communicatable manner monitors whether the start button of the cooperative application program provided in the portable communication terminal 112 operates according to the user's operation, or not (Step C1). If the start button of the cooperative application program operates in the portable communication terminal 112 (yes in Step C1), the portable communication terminal 112 confirms the version of the cooperative application program (Step C2). In addition, the portable communication terminal 112 transmits version information indicative of the version of the cooperative application program to the relay server 13 (Step C3).

Upon receiving the version information from the portable communication terminal 112, the relay server 13 determines whether the version indicated by the version information, that is, the version of the cooperative application program currently installed on the portable communication terminal 112 represents a given version (in this case, the latest version), or not (Step D1). In addition, if the version of the cooperative application program currently installed on the portable communication terminal 112 represents the latest version (yes in Step D1), the relay server 13 transmits a start permission signal of the cooperative application program to the portable communication terminal 112 (Step D2). On the other hand, if the version of the cooperative application program currently installed on the portable communication terminal 112 does not represent the latest version (no in Step D1), the relay server 13 transmits a dialog display instruction signal to the portable communication terminal 112 (Step D3). In this situation, the relay server 13 attaches version upgrade necessity designation information indicative of whether the version upgrade of the cooperative application program is essential or arbitrary to the dialog display instruction signal.

If receiving the start permission signal of the cooperative application program from the relay server 13 (yes in Step C4), the portable communication terminal 112 starts the cooperative application program in the portable communication terminal 112 (Step C5). With the above operation, a menu screen of the cooperative application program is displayed on the portable communication terminal 112. On the other hand, if receiving the dialog display instruction signal from the relay server 13 (yes in Step C6), the portable communication terminal 112 confirms whether the version upgrade of the cooperative application program is essential, or not, on the basis of the version upgrade necessity designation information attached to the dialog display instruction signal (Step C7). If the version upgrade of the cooperative application program is not essential, that is, arbitrary (no in Step C7), the portable communication terminal 112 displays an arbitrary type dialog screen G4 illustrated in FIG. 9(b) (Step C8). A description that the version upgrade (update) of the cooperative application program of the portable communication terminal 112 is arbitrary (refer to symbol c), and a description that the version upgrade of the cooperative application program is facilitated (refer to symbol d) are displayed on the arbitrary type dialog screen G4. Also, the arbitrary type dialog screen G4 is provided with a "yes" button indicating the execution of the version upgrade, and a "no" button indicating the non-execution of the version upgrade.

If the "yes" button operates on the arbitrary type dialog screen G4 (yes in Step C9), the portable communication terminal 112 downloads (acquires) the latest portable communication terminal update program from the portable communication terminal update program storage device 51 through the relay server 13, and installs the downloaded program on the portable communication terminal 112 (Step C10). In this situation, the relay server 13 provides a difference file of the update program necessary for the portable communication terminal 112 on the basis of update difference information illustrated in FIG. 7. In addition, upon completion of installing the portable communication terminal update program, the portable communication terminal 112 proceeds to the above Step C5, and starts the cooperative application program. On the other hand, if the "no" button operates on the arbitrary type dialog screen G4 (no in Step C9), the portable communication terminal 112 proceeds to the above Step C5 without downloading the latest portable communication terminal update program, and starts the cooperative application program.

Figure 9:
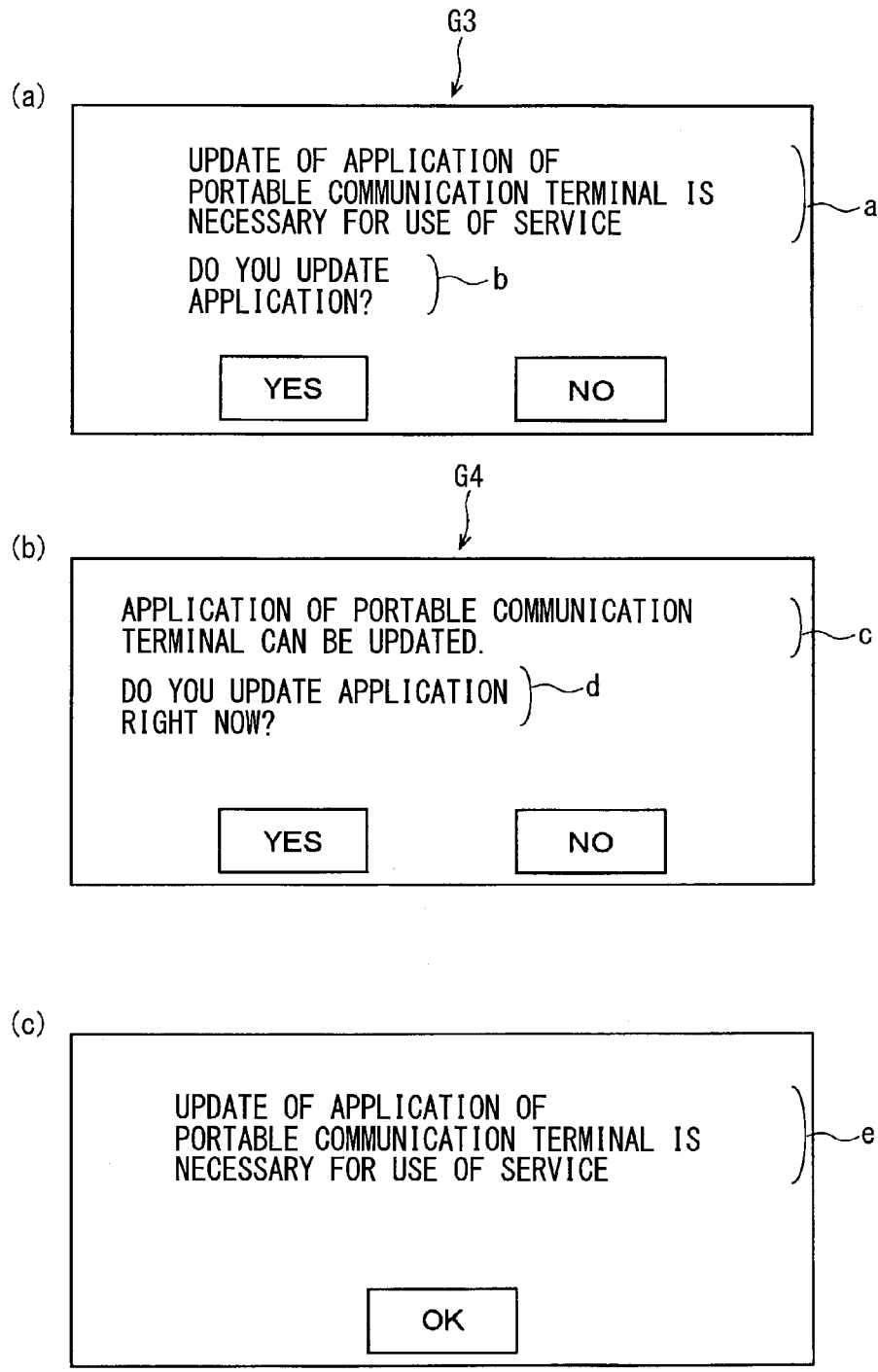
FIG. 9(a) is a diagram illustrating a required type dialog screen for the portable communication terminal.
FIG. 9(b) is a diagram illustrating an arbitrary type dialog screen for the portable communication terminal.
FIG. 9(c) is a diagram illustrating an announcement type dialog screen for the portable communication terminal.

Also, if the version upgrade of the cooperative application program is essential (yes in Step C7), the portable communication terminal 112 displays a required type dialog screen G3 illustrated in FIG. 9(a) (Step C8). A description that the version upgrade (update) of the cooperative application program of the portable communication terminal 112 is essential (refer to symbol a), and a description that the version upgrade of the cooperative application program is facilitated (refer to symbol b) are displayed on the required type dialog screen G3. Also, the required type dialog screen G3 is provided with a "yes" button indicating the execution of the version upgrade, and a "no" button indicating the non-execution of the version upgrade.

If the "yes" button operates on the required type dialog screen G3 (yes in Step C12), the portable communication terminal 112 proceeds to the above Step C10, downloads the latest portable communication terminal update program, and installs the downloaded program. In this situation, the relay server 13 provides a difference file of the update program necessary for the portable communication terminal 112 on the basis of the update difference information illustrated in FIG. 7. On the other hand, if the "no" button operates on the required type dialog screen G3 (no in Step C12), the portable communication terminal 112 proceeds to the subsequent Step C13, and displays an announcement type dialog screen G3a illustrated in FIG. 9(c), without downloading the latest portable communication terminal update program, and also without starting the cooperative application program. On the announcement type dialog screen G3a is displayed a description that the version upgrade (update) of the cooperative application program of the portable communication terminal 112 is essential (refer to symbol e). Also, the announcement type dialog screen G3a is provided with an "ok" button. If the "ok" button operates on the announcement type dialog screen G3a, the portable communication terminal 112 cancels the display of the announcement type dialog screen G3a to display a home screen (not shown) of the cooperative application program (Step C14), and completes this processing. In this case, the home screen of the cooperative application program is displayed on the portable communication terminal 112, but the service (execution of the respective contents) of the cooperative application program cannot be used from the home screen.

As described above, according to the application program update system 10 of this embodiment, in the mobile terminal 11 including the portable communication terminal 112 and the communication device 111 connected with the portable communication terminal 112 in the communicatable manner in which the respective cooperative application programs for executing the content in cooperation with each other are installed on the portable communication terminal 112 and the communication device 111, if the version of the cooperative application program of the portable communication terminal 112 and the version of the cooperative application program of the communication device 111 do not match a given version (in this case, the latest version), the portable communication terminal update program stored in the portable communication terminal update program storage device 51 is downloaded (acquired) to the portable communication terminal 112, and the communication device update program stored in the communication device update program storage device 52 is downloaded (acquired) to the communication device 111 so that versions of those cooperative application programs match the given version (latest version). With the above operation, the version of the cooperative application program installed on the portable communication terminal 112, and the version of the cooperative application program installed on the communication device 111 can match (be consistent with) the latest version in cooperation with each other. Even if the version of the cooperative application program installed on the portable communication terminal 112, and the version of the cooperative application program installed on the communication device 111 are updated, separately, those version can execute the content in cooperation with each other.

Also, if the version of the cooperative application program of the communication device 111 is newer than the version of the cooperative application program of the portable communication terminal 112, the communication device update program is prohibited from being acquired by the communication device update program acquisition processing unit 72. With the above configuration, the version of the cooperative application program of the communication device 111 can be prevented from becoming newer than the version of the cooperative application program of the portable communication terminal 112. If the cooperative application program starts, the operation in the portable communication terminal 112 can appropriately match the operation in the communication device 111. The portable communication terminal 112 is carried by the user in use, and therefore to start or upgrade the cooperative application program in the portable communication terminal 112 can be more frequently conducted than to start or upgrade the cooperative application program in the communication device 111. Hence, if the version of the cooperative application program of the communication device 111 is newer than the version of the cooperative application program of the portable communication terminal 112, the cooperative application program of the portable communication terminal 112 may be upgraded at that time.

Second Embodiment

Subsequently, a second embodiment of this disclosure will be described. In this embodiment, the operation details of the communication device 111, the portable communication terminal 112, and the relay server 13 are different from those in the above-mentioned first embodiment. Hereinafter, differences from the first embodiment will be described.

Figure 10:
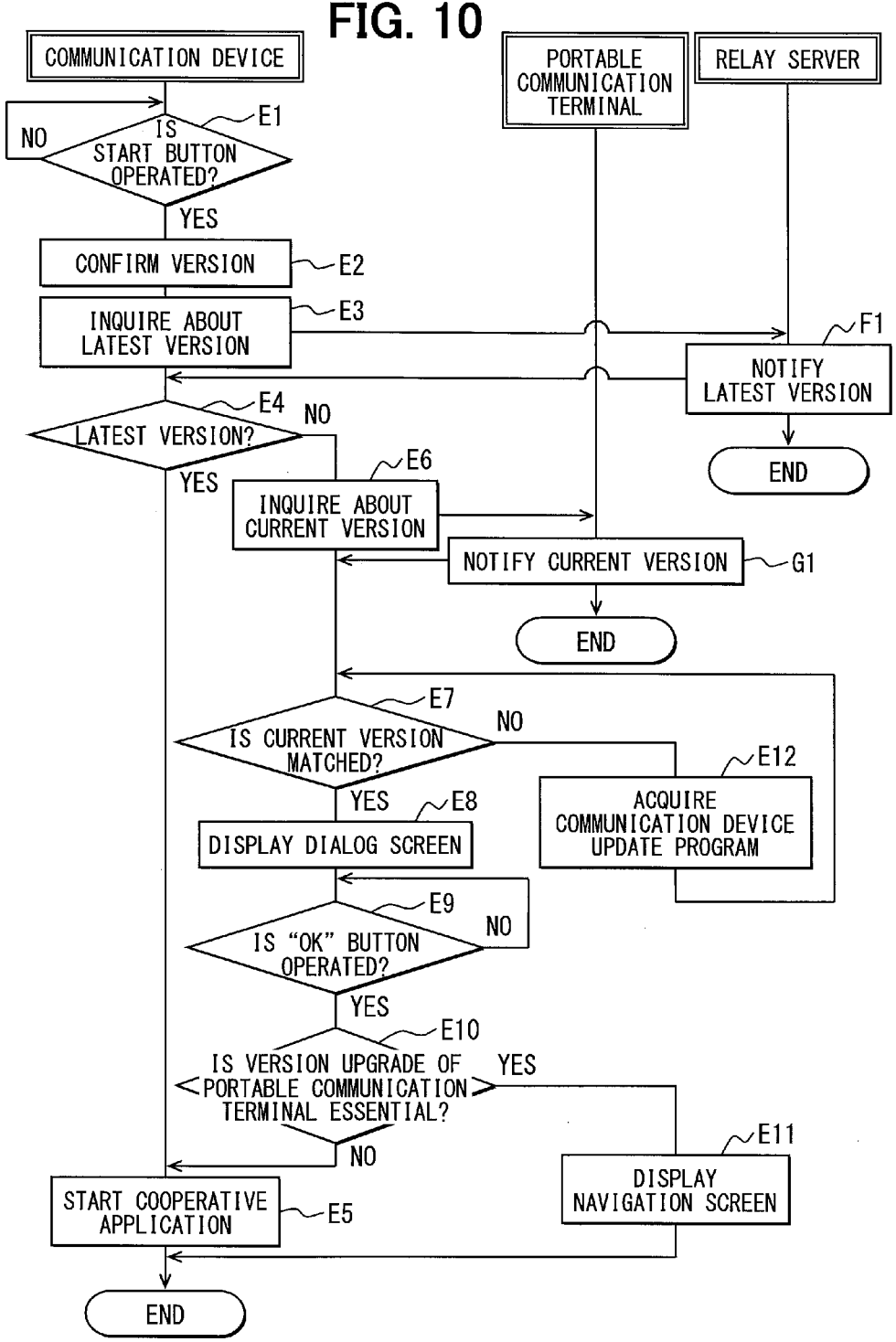
FIG. 10 is a flowchart illustrating the operation details of an application program update system according to a second embodiment.

That is, as illustrated in FIG. 10, the communication device 111 connected with the portable communication terminal 112 in the communicatable manner monitors whether the start button of the cooperative application program provided in the communication device 111 operates according to the user's operation, or not (in Step E1). If the start button of the cooperative application program operates in the communication device 111 (yes in Step E1), the communication device 111 confirms the version of the cooperative application program (Step E2). Also, the communication device 111 transmits a version inquiry signal for inquiring about the current latest version of the cooperative application program to the relay server 13 (Step E3). On the other hand, the relay server 13 that has received the version inquiry signal from the communication device 111 transmits latest version information indicative of the current latest version of the cooperative application program to the communication device 111 (Step F1). In this situation, the relay server 13 attaches an upgrade necessity designation information indicative of whether the version upgrade of the cooperative application program is essential or arbitrary to the latest version information.

Upon receiving the latest version information from the relay server 13, the communication device 111 confirms whether the cooperative application program provided in the communication device 111 is the latest version, or not (Step E4). If the cooperative application program provided in the communication device 111 is the latest version (yes in Step E4), the communication device 111 starts the cooperative application program (Step E5).

On the other hand, if the cooperative application program provided in the communication device 111 is not the latest version (no in Step E4), the communication device 111 transmits the version inquiry signal for inquiring about the current version of the cooperative application program provided in the portable communication terminal 112 to the portable communication terminal 112 connected with the communication device 111 in the communicatable manner (Step E6). On the other hand, the portable communication terminal 112 that has received the version inquiry signal from the communication device 111 transmits the current version information indicative of the current version of the cooperative application program provided in the portable communication terminal 112 to the communication device 111 (Step G1).

Upon receiving the current version information from the portable communication terminal 112, the communication device 111 confirms whether the current version of the cooperative application program provided in the communication device 111 matches the current version of the cooperative application program provided in the portable communication terminal 112, or not (Step E7).

Figure 11:
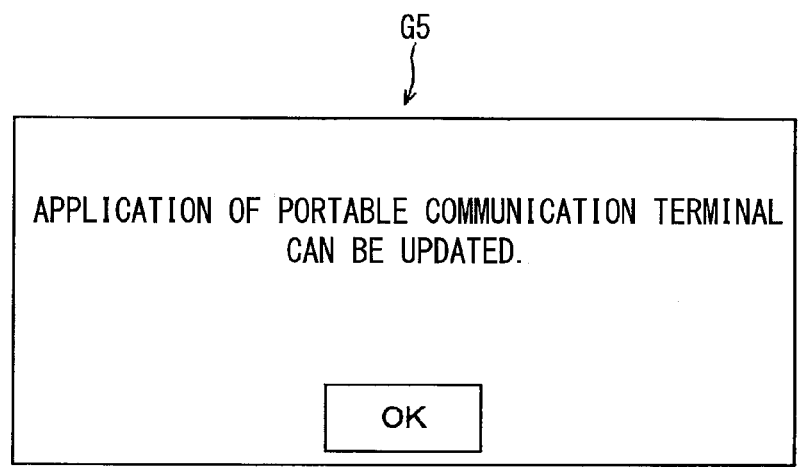
FIG. 11 is a diagram illustrating an announcement type dialog screen.

If the version of the cooperative application program of the communication device 111 matches the version of the cooperative application program of the portable communication terminal 112 (yes in Step E7), the communication device 111 displays an announcement type dialog screen G5 illustrated in FIG. 11 (Step E8). On the announcement type dialog screen G5 is displayed a description (refer to symbol a) for notifying (announcing/warning) that the cooperative application program of the portable communication terminal 112 can be upgraded. In addition, the announcement type dialog screen G5 is provided with an "ok" button for erasing the announcement type dialog screen G5 to proceed to a subsequent step.

If the "ok" button operates on the announcement type dialog screen G5 (Step E9), the communication device 111 confirms whether the version upgrade of the cooperative application program of the portable communication terminal 112 is essential, or not, on the basis of the upgrade necessity designation information attached to the latest version information received from the relay server 13 (Step E10). If the version upgrade of the cooperative application program of the portable communication terminal 112 is not essential, that is, arbitrary (no in Step E10), the communication device 111 proceeds to the above Step E5, and starts the cooperative application program. On the other hand, if the version upgrade of the cooperative application program of the portable communication terminal 112 is essential (yes in Step E10), the communication device 111 displays the screen N for route guide (Step E11).

Also, if the version of the cooperative application program of the communication device 111 does not match the version of the cooperative application program of the portable communication terminal 112 (no in Step E7), the communication device 111 downloads (acquires) the communication device update program from the communication device update program storage device 52 of the relay server 13, and installs the downloaded update program on the communication device 111 (Step E12). The communication device 111 repetitively executes download and install of the communication device update program until the version of the cooperative application program of the communication device 111 matches the version of the cooperative application program of the portable communication terminal 112.

As described above, according to the application program update system 10 of this embodiment, if the version upgrade of the cooperative application program is essential, the start of the cooperative application program is prohibited until the version of the cooperative application program of the portable communication terminal 112 matches the version of the cooperative application program of the communication device 111. With the above operation, the cooperative application programs can be prevented from starting in the portable communication terminal 112 and the communication device 111 (the content is executed on the cooperative application program) in a state where the versions of the cooperative application programs do not match each other. Further, the operation in the portable communication terminal 112 can be prevented from being inconsistent with the operation in the communication device 111.

In this embodiment, in the above Step E7, instead of confirming whether the current version of the cooperative application program provided in the communication device 111 matches the current version of the cooperative application program provided in the portable communication terminal 112, or not, it can be confirmed whether the current version of the cooperative application program provided in the portable communication terminal 112 is older than the current version of the cooperative application program provided in the communication device 111, or not.

Figure 12:
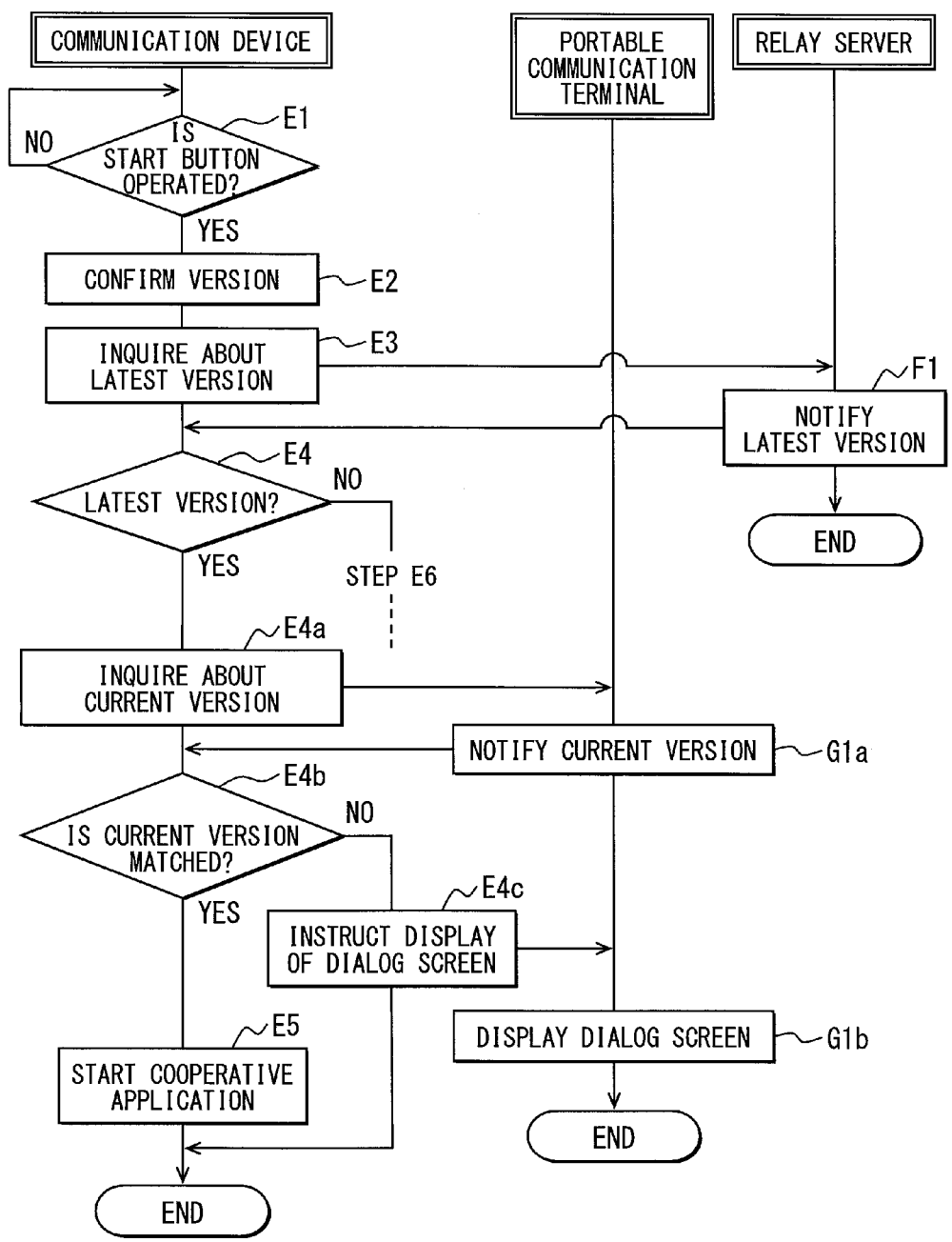
FIG. 12 is a flowchart illustrating a modification.

Also, the following processing may be executed if the cooperative application program provided in the communication device 111 is the latest version (yes in Step E4). That is, as illustrated in FIG. 12, if the cooperative application program provided in the communication device 111 is the latest version (yes in Step E4), the communication device 111 transmits the version inquiry signal for inquiring about the current version of the cooperative application program to the portable communication terminal 112 (Step E4a). On the other hand, the portable communication terminal 112 that has received the version inquiry signal from the communication device 111 transmits the current version information indicative of the current version of the cooperative application program provided in the portable communication terminal 112 to the communication device 111 (Step G1a).

Upon receiving the current version information from the portable communication terminal 112, the communication device 111 confirms whether the current version of the cooperative application program provided in the communication device 111 matches the current version of the cooperative application program provided in the portable communication terminal 112, or not, that is, whether the current version of the cooperative application program of the portable communication terminal 112 is older than the current version (in this case, the latest version) of the cooperative application program of the communication device 111, or not (Step E4b).

If the current version of the cooperative application program of the communication device 111 matches the current version of the cooperative application program of the portable communication terminal 112 (yes in Step E4b), the communication device 111 starts the cooperative application program (Step E5). On the other hand, if the current version of the cooperative application program of the communication device 111 does not match the current version of the cooperative application program of the portable communication terminal 112 (no in Step E4b), the communication device 111 transmits the dialog screen display instruction signal to the portable communication terminal 112 (Step E4c). In addition, the communication device 111 completes this processing without starting the cooperative application program.

Upon receiving the dialog screen display instruction signal from the communication device 111, the portable communication terminal 112 displays the announcement type dialog screen G5 illustrated in FIG. 11 (Step G1b), and completes this processing. With this processing, the user of the portable communication terminal 112 can recognize that the cooperative application program of the portable communication terminal 112 needs to be upgraded. The portable communication terminal 112 may be set to display the announcement type dialog screen G5 as far as the version is "essential".

Third Embodiment

Subsequently, a third embodiment of this disclosure will be described. This embodiment is different from the above first embodiment in the operating details of the communication device 111, the portable communication terminal 112, and the relay server 13. Hereinafter, the differences from the first embodiment will be described.

Figure 13:
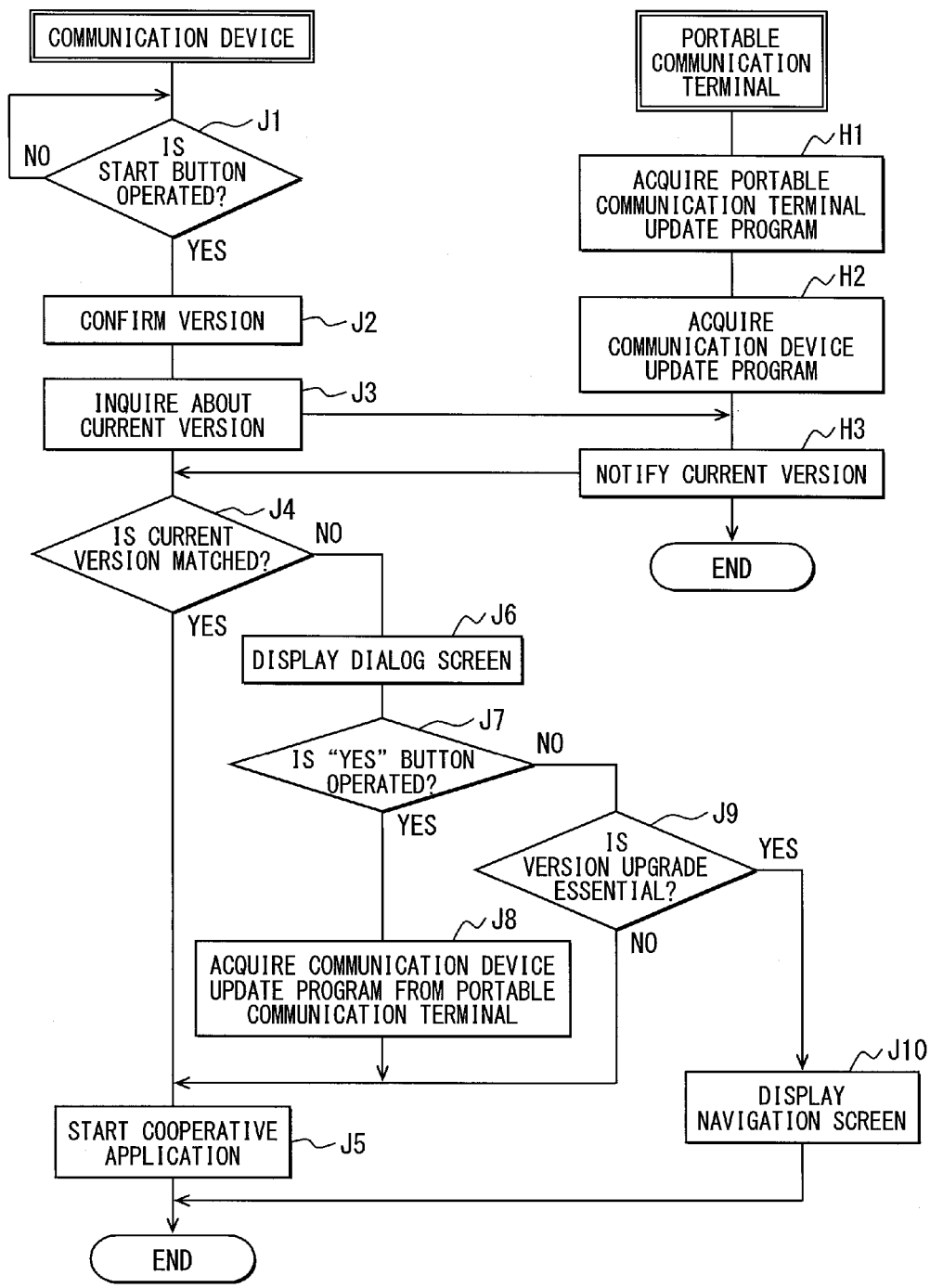
FIG. 13 is a flowchart illustrating the operation details of an application program update system according to a third embodiment.

Even if the communication device 111 is not connected to the portable communication terminal 112 in the communicatable manner, the communication device 111 can start the cooperative application program, independently. The communication device 111 can upgrade the cooperative application program provided in the communication device 111, independently. Likewise, even if the portable communication terminal 112 is not connected to the communication device 111 in the communicatable manner, the portable communication terminal 112 can start the cooperative application program, independently. In addition, the portable communication terminal 112 can upgrade the cooperative application program provided in the portable communication terminal 112, independently. In this case, as illustrated in FIG. 13, when the portable communication terminal 112 downloads the portable communication terminal update program from the portable communication terminal update program storage device 51, and installs the downloaded update program on the portable communication terminal 112 (Step H1), the portable communication terminal 112 downloads (acquires) the communication device update program of the version (matching version, or the version allowed to start in cooperation with each other) corresponding to the portable communication terminal update program from the communication device update program storage device 52, and stores the downloaded update program in the storage unit 43 of the portable communication terminal 112 (Step H2).

On the other hand, when the communication device 111 is connected with the portable communication terminal 112 in the communicatable manner, the communication device 111 monitors whether the start button of the cooperative application program provided in the communication device 111 operates according to the user's operation, or not (Step J1). If the start button of the cooperative application program operates in the communication device 111 (yes in Step J1), the communication device 111 confirms the version of the cooperative application program (Step J2). Also, the communication device 111 transmits a version inquiry signal for inquiring about the current version of the cooperative application program provided in the portable communication terminal 112 to the portable communication terminal 112 which is connected with the communication device 111 in the communicatable manner (Step J3). On the other hand, the portable communication terminal 112 that has received the version inquiry signal from the communication device 111 transmits current version information indicative of the current version of the cooperative application program provided in the portable communication terminal 112 to the communication device 111 (Step H3). In this situation, the portable communication terminal 112 attaches an upgrade necessity designation information indicative of whether the version upgrade of the cooperative application program is essential or arbitrary, to the current version information.

Upon receiving the current version information from the portable communication terminal 112, the communication device 111 confirms whether the current version of the cooperative application program provided in the communication device 111 matches the current version of the cooperative application program provided in the portable communication terminal 112, or not (Step J4).

If the version of the cooperative application program of the communication device 111 matches the version of the cooperative application program of the portable communication terminal 112 (yes in Step J4), the communication device 111 starts the cooperative application program (Step J5). On the other hand, if the version of the cooperative application program of the communication device 111 does not match the version of the cooperative application program of the portable communication terminal 112 (no in Step J4), the communication device 111 displays the required type dialog screen G1 illustrated in FIG. 6(*a*) or the arbitrary type dialog screen G2 illustrated in FIG. 6(*b*) according to the upgrade necessity designation information attached to the current version information received from the portable communication terminal 112 (Step J6).

If the "yes" button operates on the required type dialog screen G1 or the arbitrary type dialog screen G2 (yes in Step J7), the communication device 111 downloads (acquires) the communication device update program from the portable communication terminal 112, and installs the downloaded update program on the communication device 111 (Step J8). In addition, upon completion of installing the communication device update program, the communication device 111 proceeds to the above Step J5, and starts the cooperative application program.

On the other hand, if the "no" button operates on the required type dialog screen G1 or the arbitrary type dialog screen G2 (no in Step J7), the communication device 111 confirms whether the version upgrade of the cooperative application program is essential, or not, on the basis of the upgrade necessity designation information attached to the current version information received from the portable communication terminal 112 (Step J9). If the version upgrade of the cooperative application program is not essential, that is, arbitrary (no in Step J9), the communication device 111 proceeds to the above Step J5, and starts the cooperative application program. On the other hand, if the version upgrade of the cooperative application program is essential (yes in Step J9), the communication device 111 displays the navigation screen N for route guide (Step J10).

As described above, according to the application program update system 10 of this embodiment, if the version of the cooperative application program of the portable communication terminal 112 does not match the cooperative application program of the communication device 111, the portable communication terminal update program stored in the portable communication terminal update program storage device 51 is downloaded (acquired) to the portable communication terminal 112 so that the versions of those cooperative application programs match each other. Also, the communication device update program stored in the communication device update program storage device 52 is stored in the portable communication terminal 112 once, and downloaded (acquired) to the communication device 111. As a result, the version of the cooperative application program installed on the portable communication terminal 112 can match the version of the cooperative application program installed on the communication device 111 in cooperation with each other.

Fourth Embodiment

Subsequently, a fourth embodiment of this disclosure will be described. In this embodiment, the version confirmation process of the cooperative application programs of the communication device 111 and the portable communication terminal 112 is conducted by the relay server 13.

Figure 14:
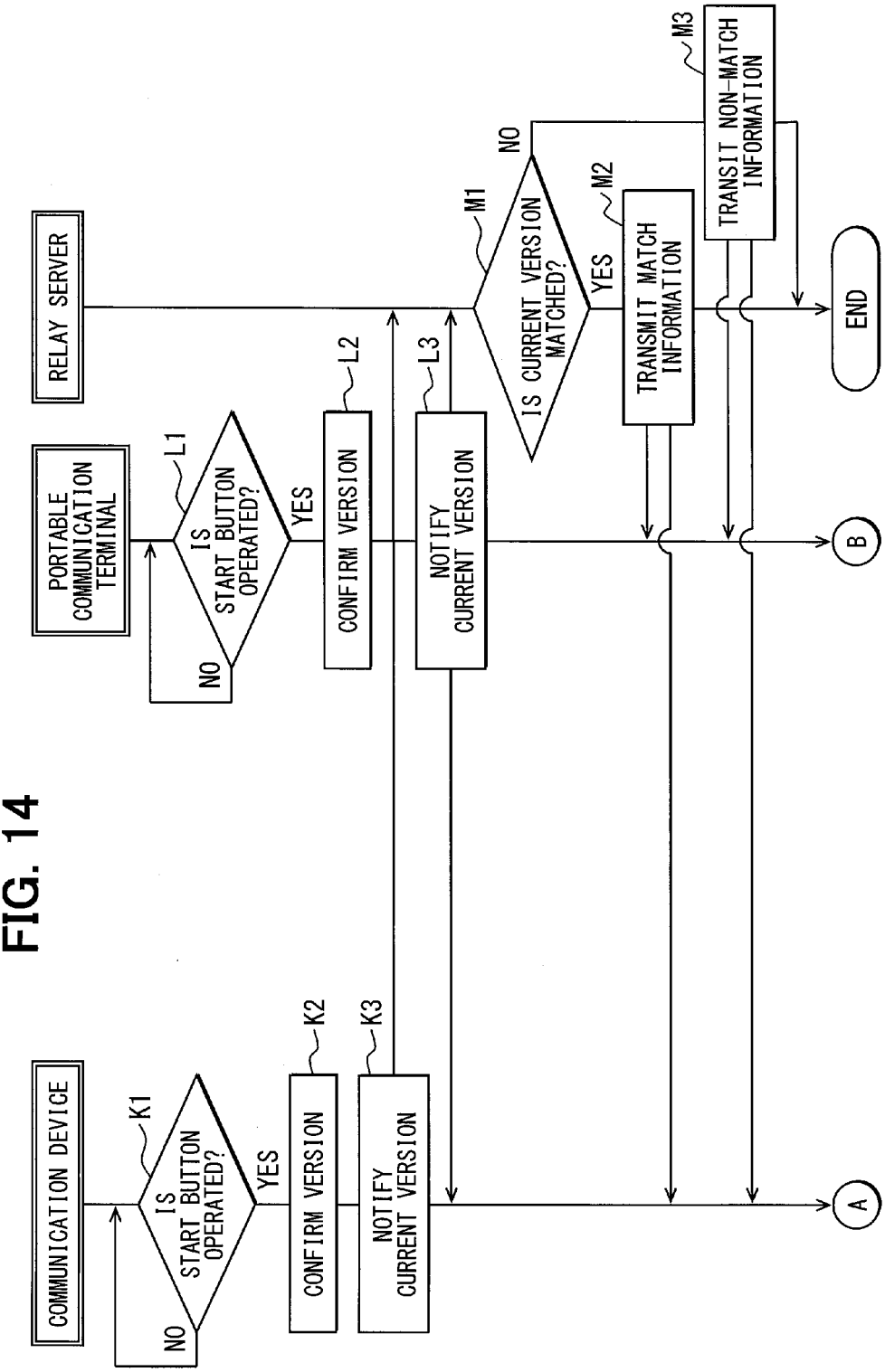
FIG. 14 is a flowchart illustrating the operation details of an application program update system according to a fourth embodiment.

That is, as illustrated in FIG. 14, if the start button of the cooperative application program operates in the communication device 111 (yes in Step K1), the communication device 111 confirms the version of the cooperative application program (Step K2), and transmits the current version (current version information) of the cooperative application program of the communication device 111 to the relay server 13 (Step K3). Also, if the start button of the cooperative application program operates in the portable communication terminal 112 (yes in Step L1), the portable communication terminal 112 confirms the version of the cooperative application program (Step L2), and transmits the current version (current version information) of the cooperative application program of the portable communication terminal 112 to the communication device 111 and the relay server 13 (Step L3). The portable communication terminal 112 can attach the upgrade necessity designation information to the current version to be transmitted to the communication device 111.

Upon receiving the current version information from the communication device 111 and the portable communication terminal 112, the relay server 13 confirms whether the current version of the cooperative application program of the communication device 111 matches the current version of the cooperative application program of the portable communication terminal 112, or not (Step M1). If the versions of those cooperative application programs match each other (yes in Step M1), the relay server 13 transmits match information indicative of this fact to the communication device 111 and the portable communication terminal 112 (Step M2). On the other hand, if the versions of those cooperative application programs do not match each other (no in Step M1), the relay server 13 transmits mismatch information indicative of this fact to the communication device 111 and the portable communication terminal 112 (Step M3).

Figure 15:
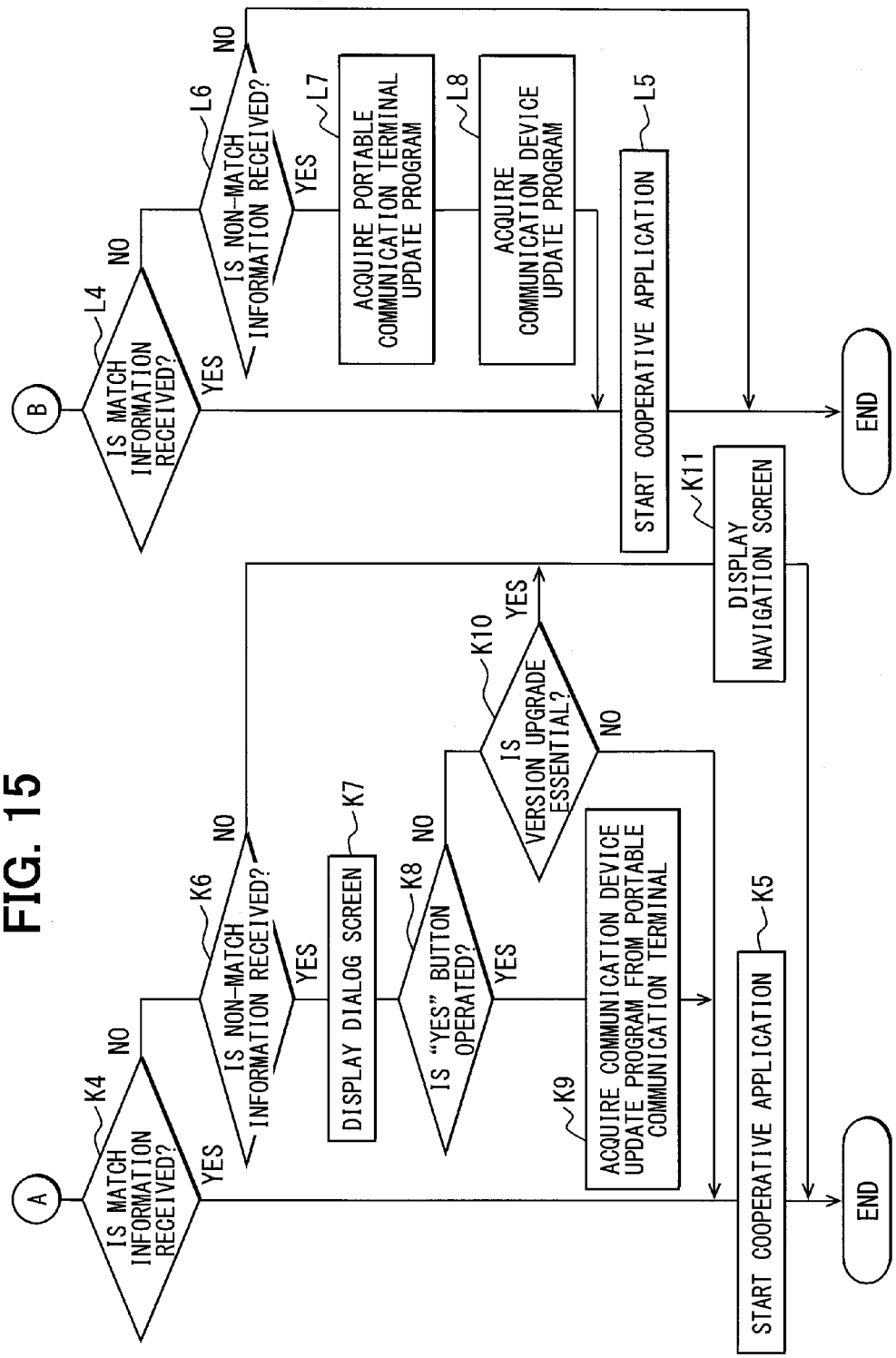
FIG. 15 is a flowchart illustrating the operation details of the application program update system according to the fourth embodiment.

As illustrated in FIG. 15, if the communication device 111 receives the match information (yes in Step K4), the communication device 111 starts the cooperative application program provided in the communication device 111 (Step K5). On the other hand, if the portable communication terminal 112 receives the match information (yes in Step L4), the portable communication terminal 112 starts the cooperative application program provided in the portable communication terminal 112 (Step L6).

Figure 6:
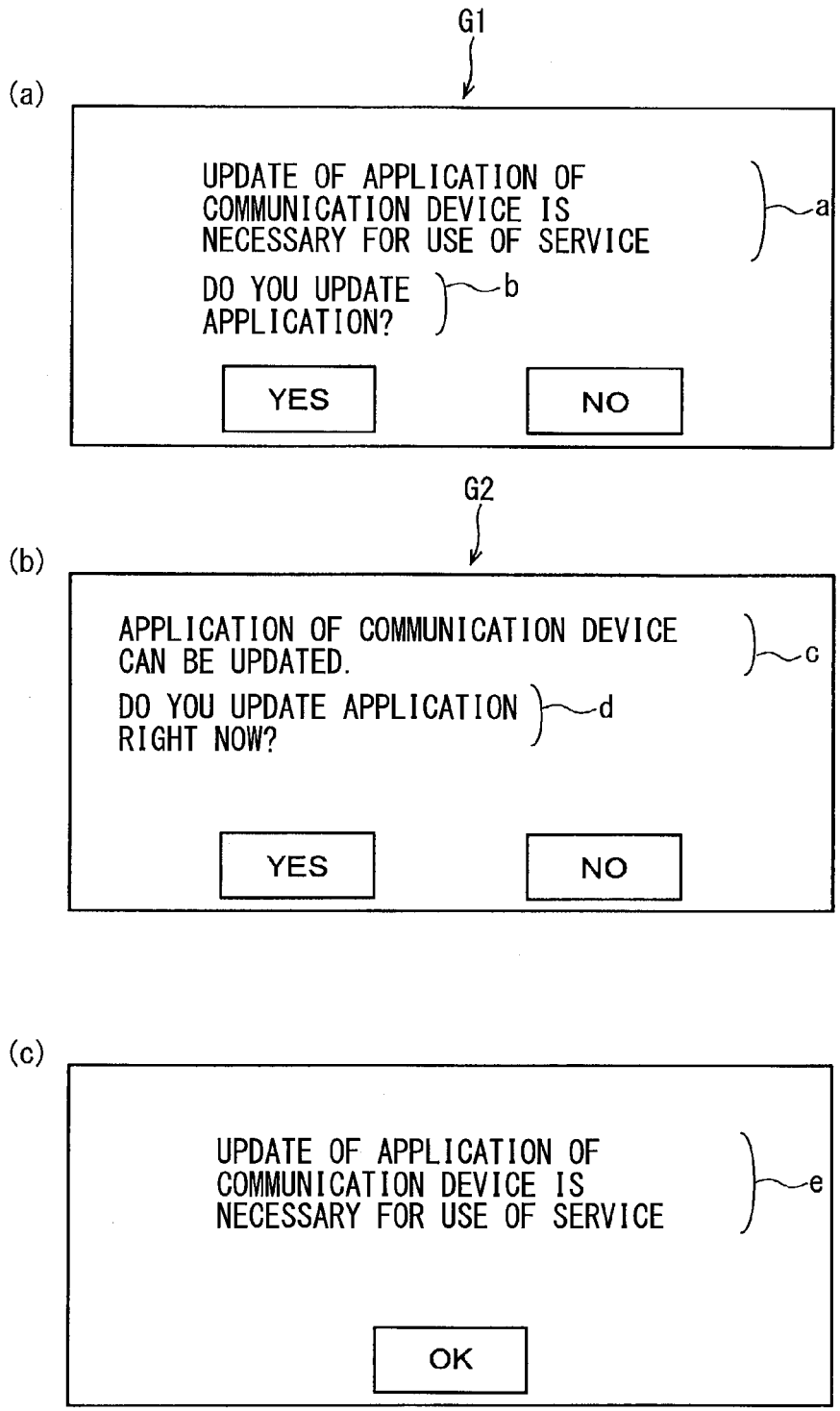
FIG. 6(a) is a diagram illustrating a required type dialog screen for the communication device.
FIG. 6(b) is a diagram illustrating an arbitrary type dialog screen for the communication device.
FIG. 6(c) is a diagram illustrating an announcement type dialog screen for the communication device.

Also, if the communication device 111 receives the mismatch information (yes in Step K6), the communication device 111 displays the required type dialog screen G1 illustrated in FIG. 6(*a*), or the arbitrary type dialog screen G2 illustrated in FIG. 6(*b*) (Step K7). On the other hand, if the portable communication terminal 112 receives the mismatch information (yes in Step L6), the portable communication terminal 112 downloads the portable communication terminal update program from the portable communication terminal update program storage device 51, and installs the downloaded update program on the portable communication terminal 112 (Step L7). Also, the portable communication terminal 112 downloads (acquires) the communication device update program of the version corresponding to the portable communication terminal update program from the communication device update program storage device 52, and stores the downloaded update program in the storage unit 43 of the portable communication terminal 112 (Step L8). In addition, the portable communication terminal 112 starts the cooperative application program of the portable communication terminal 112 (Step L5), and completes this processing. If the portable communication terminal 112 receives none of the match information and the mismatch information (no in Step L6), the portable communication terminal 112 completes this processing without starting the cooperative application program of the portable communication terminal 112.

If the "yes" button operates on the required type dialog screen G1 or the arbitrary type dialog screen G2 (yes in Step K8), the communication device 111 downloads (acquires) the communication device update program from the portable communication terminal 112, and installs the downloaded update program on the communication device 111 (Step K9). In addition, upon completion of installing the communication device update program, the communication device 111 proceeds to the above Step K5, and starts the cooperative application program of the communication device 111.

On the other hand, if the "no" button operates on the required type dialog screen G1 or the arbitrary type dialog screen G2 (no in Step K8), the communication device 111 confirms whether the version upgrade of the cooperative application program is essential, or not, on the basis of the upgrade necessity designation information attached to the current version information received from the portable communication terminal 112 (Step K10). If the version upgrade of the cooperative application program is not essential, that is, arbitrary (no in Step K10), the communication device 111 proceeds to the above Step K5, and starts the cooperative application program of the communication device 111. On the other hand, if the version upgrade of the cooperative application program is essential (yes in Step K10), the communication device 111 displays the navigation screen N for route guide (Step K11). If the communication device 111 receives none of the match information and the mismatch information (no in Step K6), the communication device 111 completes this processing without starting the cooperative application program of the portable communication device 111.

Also in this embodiment described above, in a configuration in which the cooperative application program of the communication device 111 and the cooperative application program of the portable communication terminal 112 are updated, separately, the versions of those application programs can match each other, and execute the content in cooperation with each other.

Fifth Embodiment

Subsequently, a fourth embodiment of this disclosure will be described. In this embodiment, the version confirmation process of the cooperative application programs of the communication device 111 and the portable communication terminal 112 is conducted in the portable communication terminal 112.

Figure 16:
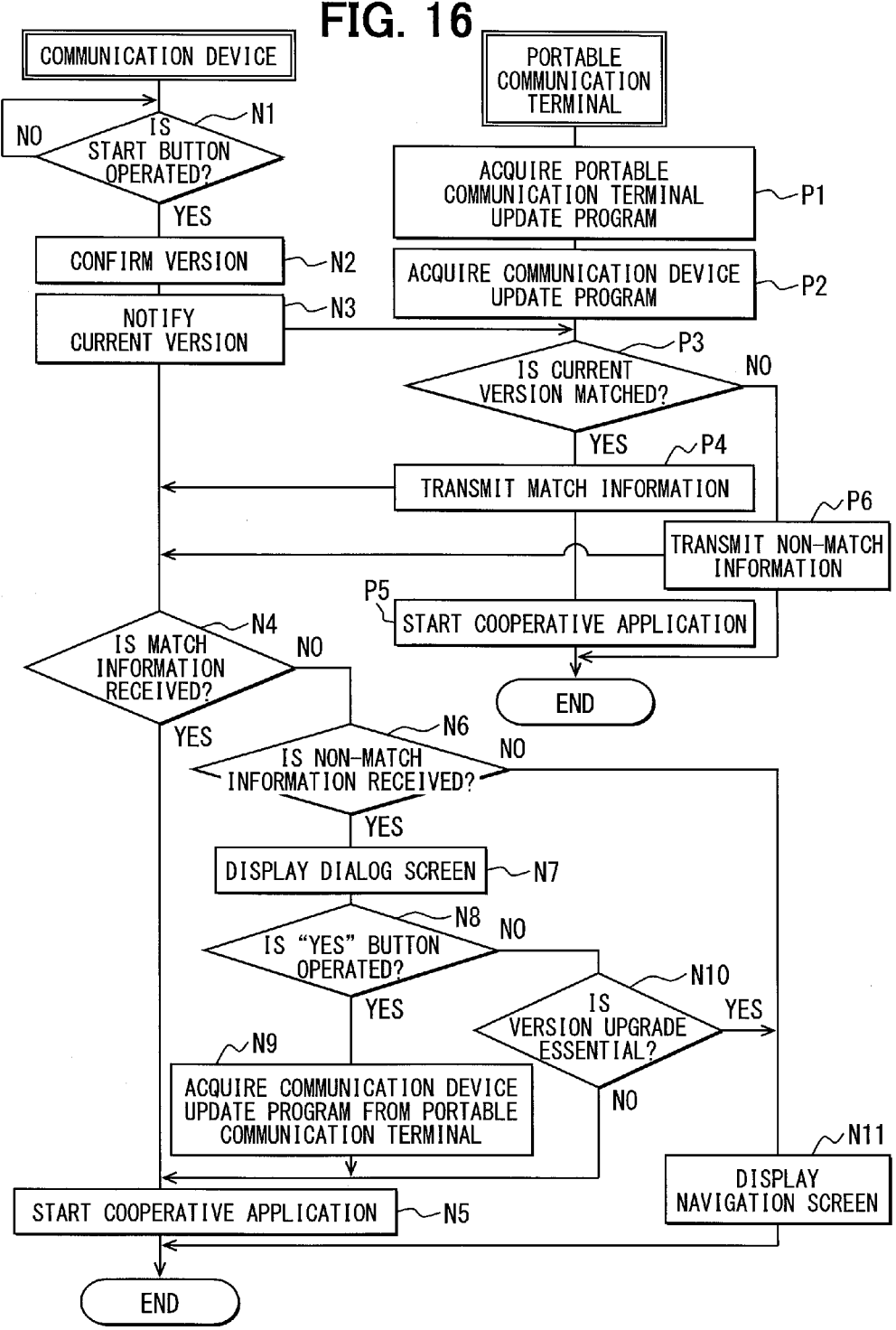
FIG. 16 is a flowchart illustrating the operation details of an application program update system according to a fifth embodiment.

That is, as illustrated in FIG. 16, when the start button of the cooperative application program operates in the communication device 111 (yes in Step N1), the communication device 111 confirms the version of the cooperative application program (Step N2), and transmits the current version (current version information) of the cooperative application program of the communication device 111 to the portable communication terminal 112 (Step N3). On the other hand, the portable communication terminal 112 downloads the portable communication terminal update program from the portable communication terminal update program storage device 51, and installs the downloaded update program on the portable communication terminal 112 (Step P1). Also, the portable communication terminal 112 downloads (acquires) the communication device update program of the version corresponding to the portable communication terminal update program from the communication device update program storage device 52, and stores the downloaded update program in the storage unit 43 of the portable communication terminal 112 (Step P2).

Upon receiving the current version information from the communication device 111, the portable communication terminal 112 confirms whether the current version of the cooperative application program of the communication device 111 matches the current version of the cooperative application program of the portable communication terminal 112, or not (Step P3). If the versions of those cooperative application programs match each other (yes in Step P3), the portable communication terminal 112 transmits the match information indicative of this fact to the communication device 111 (Step P4), and starts the cooperative application program of the portable communication terminal 112 (Step P5). On the other hand, if the versions of those cooperative application programs do not match each other (no in Step P3), the portable communication terminal 112 transmits the mismatch information indicative of this fact to the communication device 111 (Step P6). In this case, the portable communication terminal 112 completes this processing without starting the cooperative application program of the portable communication terminal 112. The portable communication terminal 112 can attach the current version information indicative of the current version of the cooperative application program of the portable communication terminal 112, and the upgrade necessity designation information indicating that the version upgrade corresponding to the version is essential or arbitrary to the match information or the mismatch information.

If the communication device 111 receives the match information (yes in Step N4), the communication device 111 starts the cooperative application program provided in the communication device 111 (Step N5). On the other hand, if the communication device 111 receives the mismatch information (yes in Step N6), the communication device 111 displays the required type dialog screen G1 illustrated in FIG. 6(*a*), or the arbitrary type dialog screen G2 illustrated in FIG. 6(*b*) (Step N7).

If the "yes" button operates on the required type dialog screen G1 or the arbitrary type dialog screen G2 (yes in Step N8), the communication device 111 downloads (acquires) the communication device update program from the portable communication terminal 112, and installs the downloaded update program on the communication device 111 (Step N9). In addition, upon completion of installing the communication device update program, the communication device 111 proceeds to the above Step N5, and starts the cooperative application program of the communication device 111.

On the other hand, if the "no" button operates on the required type dialog screen G1 or the arbitrary type dialog screen G2 (no in Step N8), the communication device 111 confirms whether the version upgrade of the cooperative application program is essential, or not, on the basis of the upgrade necessity designation information attached to the current version information received from the portable communication terminal 112 (Step N10). If the version upgrade of the cooperative application program is not essential, that is, arbitrary (no in Step N10), the communication device 111 proceeds to the above Step N5, and starts the cooperative application program of the communication device 111. On the other hand, if the version upgrade of the cooperative application program is essential (yes in Step N10), the communication device 111 displays the navigation screen N for route guide (Step N11). If the communication device 111 receives none of the match information and the mismatch information (no in Step N6), the communication device 111 completes this processing without starting the cooperative application program of the portable communication device 111.

Also in this embodiment described above, in a configuration in which the cooperative application program of the communication device 111 and the cooperative application program of the portable communication terminal 112 are updated, separately, the versions of those application programs can match each other, and execute the content in cooperation with each other.

Other Embodiments

The setting of "essential" or "arbitrary" of the version upgrade of the cooperative application program can be implemented with an appropriate change. That is, in the communication device 111, the update of a portion not always requiring the cooperation with the portable communication terminal 112 (for example, correction or change of the display screen for the communication device 111, correction or change of a sequence implemented only in the communication device 111) can be set as an "arbitrary" update. Also, in the portable communication terminal 112, the update of a portion not always requiring the cooperation with the communication device 111 (for example, correction or change of the display screen for the portable communication terminal 112, correction or change of a sequence implemented only in the portable communication terminal 112) can be set as an "arbitrary" update.

Also, in the communication device 111, even in the update of the portion not always requiring the cooperation with the portable communication terminal 112, the update that affects the communication operation with the relay server 13 can be set as the "essential" update. Also, in the communication device 111, the update that affects the communication operation (cooperation operation) with portable communication terminal 112 can be set as the "essential" update. For that reason, for example, update that a new content or program is added to the communication device 111, or the existing content or program is deleted therefrom may be set as "essential".

Also, in the portable communication terminal 112, even in the update of the portion not always requiring the cooperation with the communication device 111, the update that affects the communication operation with the relay server 13 can be set as the "essential" update. Also, in the portable communication terminal 112, the update that affects the communication operation (cooperation operation) with the communication device 111 can be set as the "essential" update. For that reason, for example, update that a new content or program is added to the portable communication terminal 112, or the existing content or program is deleted therefrom may be set as "essential".

Also, the determination of whether the versions in the communication device 111 or the portable communication terminal 112 match each other, or not, may be set to be conducted under a condition that the cooperative application program starts in the portable communication terminal 112. That is, the communication device 111 or the portable communication terminal 112 may be set to determine whether the versions match each other, or not, after the cooperative application program has started in the portable communication terminal 112.

In the communication device 111 and the portable communication terminal 112, the version upgrade of the cooperative application programs may be set to be executed when the respective cooperative application programs start, independently. With this configuration, when the respective cooperative application programs start in the communication device 111 and the portable communication terminal 112 independently which are disconnected from each other, and the communication device 111 and portable communication terminal 112 are connected to each other in the communicatable manner, the versions of those cooperative application programs provided in the communication device 111 and the portable communication terminal 112 match each other. For that reason, the content can be executed on the cooperative application program immediately.

The determination process of whether the versions match each other, or not, that is, the determination process of whether the version of the cooperative application program installed on the portable communication terminal 112 matches the version of the portable communication terminal update program stored in the portable communication terminal update program storage device 51, or not, and/or whether the version of the cooperative application program installed on the communication device 111 matches the version of the communication device update program stored in the communication device update program storage device 52, or not, may be executed in the relay server 13. With the above configuration, the determination process of the version can be implemented in the relay server 13 with high precision in an integrated fashion.

All or a part of the components (in this case, the communication device update program storage device 52, the cooperative application program start prohibition processing unit 64, and the update program acquisition prohibition processing unit 65) provided in the relay server 13 may be included in the portable communication terminal 112. In this case, the determination process of whether the versions match each other, or not, may be also executed in the portable communication terminal 112.

The old and new versions (the version is new or old) are not compared by only numerical values (numerical value, for example, the version "4.0") indicative of the versions, but compared on the basis of the presence or absence of application program of a correction file or a patch file, for example, for correction to a defect or addition of a function.

According to this embodiment, since the execution process per se of the content program is conducted in the portable communication terminal 112, a processing load of the communication device 111 can be reduced. Hence, the communication device 111 can execute processing (for example, a travel regulation process for regulating the operation or the output of the content from the communication device 111 during the travel of the vehicle) high in load such as the operation control depending on other processing, for example, a travel condition of a vehicle without difficulty.

The communication device 111 is exemplified by the navigation device, but is not always the navigation device. For example, a device on which an application program having a guide function is installed may be applied as the communication device. Also, the communication device may be configured by, for example, an in-vehicle device incorporated into the vehicle as well as, for example, a portable wireless device detachably attached to the vehicle.

The communication device 111 and the portable communication terminal 112 may be connected to each other to be communicatable with each other by a wired communication line. Also, the mobile terminal 11 may be configured with the combination of the communication device 111 and the portable communication terminal 112 with another device or terminal. In this case, the version of the cooperative application program provided in another device or terminal matches the other versions in cooperation with each other under a control.

The communication device update program storage device 52 may be provided in the relay server 13, and the portable communication terminal update program storage device 51 may be provided in the content delivery server 12. The respective embodiments and the modification may be implemented in combination.

In this example, the portable communication terminal update program storage device 51 corresponds to the portable communication terminal update program storage device, the communication device update program storage device 52 corresponds to the communication device update program storage device, the cooperative application program start prohibition processing unit 64 corresponds to the content execution prohibition device, the update program acquisition prohibition processing unit 65 corresponds to the update program acquisition prohibition device, the communication device version identification processing unit 71 corresponds to the communication device version identification device, the communication device update program acquisition processing unit 72 corresponds to the communication device update program acquisition device, the portable communication terminal version identification processing unit 81 corresponds to the portable communication terminal version identification device, and the portable communication terminal update program acquisition processing unit 82 corresponds to the portable communication terminal update program acquisition device.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An application program update system executed on a processor, the system comprising:
   a communication device having a cooperative application program for executing a content in cooperation with a portable communication terminal;
   a communication device update program storage device that stores an update program of the cooperative application program installed on the communication device as a communication device update program;
   a communication device update program acquisition device that inputs the communication device update program to the communication device when a version of the cooperative application program installed on the communication device does not match a version of the communication device update program stored in the communication device update program storage device;
   a portable communication terminal update program storage device that stores an update program of the cooperative application program installed on the portable communication terminal as a portable communication terminal update program;
   a portable communication terminal update program acquisition device that inputs the portable communication terminal update program to the portable communication terminal when a version of the cooperative application program installed on the portable communication terminal does not match a version of the portable communication terminal update program stored in the portable communication terminal update program storage device; and
   an update program acquisition prohibition device that prohibits the communication device update program acquisition device from inputting the communication device update program when the version of the communication device update program stored in the communication device update program storage device is newer than the version of the cooperative application program installed on the portable communication terminal,
   wherein the portable communication terminal has the cooperative application program for executing the content in cooperation with the communication device.

2. The application program update system according to claim 1 further comprising:
   a content execution prohibition device that prohibits the cooperative application program from executing the content until the version of the cooperative application program installed on the communication device matches a latest version of the communication device update program.

3. The application program update system according to claim 1 further comprising:
a content execution prohibition device that prohibits the cooperative application program from executing the content until the version of the cooperative application program installed on the portable communication terminal matches a latest version of the portable communication terminal update program.

4. The application program update system according to claim 1 further comprising:
a content execution prohibition device that prohibits the cooperative application program from executing the content until the version of the cooperative application program installed on the communication device matches the version of the cooperative application program installed on the portable communication terminal.

5. The application program update system according to claim 1,
wherein, when the portable communication terminal update program is input from the portable communication terminal update program storage device, the portable communication terminal update program acquisition device acquires the communication device update program having the version corresponding to the portable communication terminal update program from the communication device update program storage device, and inputs the communication device update program to the portable communication terminal, and
wherein the communication device update program acquisition device inputs the communication device update program stored in the portable communication terminal to the communication device.

6. The application program update system according to claim 1, further comprising:
a relay server that relays a data communication between at least one of the communication device and the portable communication terminal, and a content delivery server that delivers the content,
wherein the relay server executes at least one of determination of whether the version of the cooperative application program installed in the portable communication terminal matches the version of the portable communication terminal update program stored in the portable communication terminal update program storage device, and determination of whether the version of the cooperative application program installed in the communication device matches the version of the communication device update program stored in the communication device update program storage device.

7. The application program update system according to claim 6,
wherein the communication device update program storage device is provided in the relay server, and
wherein the portable communication terminal update program storage device is provided in the content delivery server.

8. The application program update system according to claim 1,
wherein the communication device update program acquisition device determines whether the version of the cooperative application program matches the version of the communication device update program stored in the communication device update program storage device when the cooperative application program installed on the communication device is activated, and
wherein the portable communication terminal update program acquisition device determines whether the version of the cooperative application program matches the version of the portable communication terminal update program stored in the portable communication terminal update program storage device when the cooperative application program installed in the portable communication terminal is activated.

9. A communication device that has a cooperative application program for executing a content in cooperation with a portable communication terminal, and acquires a communication device update program which is an update program of the cooperative application program from an external communication device update program storage device executed on a computer processor, the communication device comprising:
a communication device update program acquisition device that acquires the communication device update program when a version of an installed cooperative application program does not match a version of the communication device update program stored in the communication device update program storage device,
wherein the portable communication terminal has the cooperative application program for executing the content in cooperation with the communication device,
wherein the portable communication terminal further includes:
a portable communication terminal update program storage device that stores an update program of the cooperative application program installed on the portable communication terminal as a portable communication terminal update program; and
a portable communication terminal update program acquisition device that inputs the portable communication terminal update program to the portable communication terminal when a version of the cooperative application program installed on the portable communication terminal does not match a version of the portable communication terminal update program stored in the portable communication terminal update program storage device, and
wherein an update program acquisition prohibition device prohibits the communication device update program acquisition device from inputting the communication device update program when the version of the communication device update program stored in the communication device update program storage device is newer than the version of the cooperative application program installed on the portable communication terminal.

10. A portable communication terminal that has a cooperative application program for executing a content in cooperation with a communication device, and acquires a portable communication terminal update program which is an update program of the cooperative application program from an external portable communication terminal update program storage device executed on a processor, the portable communication terminal comprising:
a portable communication terminal update program acquisition device that acquires the portable communication terminal update program when a version of an installed cooperative application program does not match a version of the portable communication terminal update program stored in the portable communication terminal update program storage device, wherein the communication device includes:
- a communication device update program storage device that stores an update program of the cooperative application program installed on the communication device as a communication device update program; and
- a communication device update program acquisition device that inputs the communication device update program to the communication device when a version of the cooperative application program installed on the communication device does not match a version of the communication device update program stored in the communication device update program storage device, and wherein an update program acquisition prohibition device prohibits the communication device update program acquisition device from inputting the communication device update program when the version of the communication device update program stored in the communication device update program storage device is newer than the version of the cooperative application program installed on the portable communication terminal.

11. A tangible non-transitory computer readable medium storing computer executable instructions, the instructions comprising a computer executable method for updating an application program based on an update program, the tangible non-transitory computer readable medium having a cooperative application program for executing a content in cooperation with a portable communication terminal, and installed on a communication device for acquiring a communication device update program, which is an update program of the cooperative application program, from an external communication device update program storage device, the instructions comprising:

comparing a version of the cooperative application program installed on the communication device with a version of the communication device update program stored in the communication device update program storage device;

inputting the communication device update program to the communication device when the version of the cooperative application program installed on the communication device does not match the version of the communication device update program stored in the communication device update program storage device;

storing an update program of the cooperative application program installed on the portable communication terminal as a portable communication terminal update program;

inputting the portable communication terminal update program to the portable communication terminal when a version of the cooperative application program installed on the portable communication terminal does not match a version of the portable communication terminal update program stored in the portable communication terminal; and prohibiting from inputting the communication device update program when the version of the communication device update program stored in the communication device is newer than the version of the cooperative application program installed on the portable communication terminal.

12. A tangible non-transitory computer readable medium storing computer executable instructions, the instructions comprising a computer executable method for updating an application program based on an update program, the tangible non-transitory computer readable medium having a cooperative application program for executing a content in cooperation with a communication device, and installed on a portable communication terminal for acquiring a portable communication terminal update program, which is an update program of the cooperative application program, from an external portable communication terminal update program storage device, the instructions comprising:

comparing a version of the cooperative application program installed on the portable communication terminal with a version of the portable communication terminal update program stored in the portable communication terminal update program storage device; and inputting the portable communication terminal update program to the portable communication terminal when the version of the cooperative application program installed on the portable communication terminal does not match the version of the portable communication terminal update program stored in the portable communication terminal update program storage device;

storing an update program of the cooperative application program installed on the communication device as a communication device update program;

inputting a communication device update program to the communication device when a version of the cooperative application program installed on the communication device does not match a version of the communication device update program stored in the communication device; and prohibiting from inputting the communication device update program when the version of the communication device update program stored in the communication device is newer than the version of the cooperative application program installed on the portable communication terminal.

* * * * *